United States Patent
Djordjevic et al.

(10) Patent No.: US 10,574,447 B2
(45) Date of Patent: Feb. 25, 2020

(54) ANTENNA ARRAY BASED OAM WIRELESS COMMUNICATION

(71) Applicant: NEC Laboratories America, Inc., Princeton, NJ (US)

(72) Inventors: Ivan Djordjevic, Tucson, AZ (US); Ting Wang, West Windsor, NJ (US); Shaoliang Zhang, Princeton, NJ (US)

(73) Assignee: NEC Corporation (JP)

( * ) Notice: Subject to any disclaimer, the term of this patent is extended or adjusted under 35 U.S.C. 154(b) by 5 days.

(21) Appl. No.: 15/897,913

(22) Filed: Feb. 15, 2018

(65) Prior Publication Data

US 2018/0234285 A1  Aug. 16, 2018

Related U.S. Application Data

(60) Provisional application No. 62/459,688, filed on Feb. 16, 2017.

(51) Int. Cl.
*H04L 9/08* (2006.01)
*H04B 10/70* (2013.01)
(Continued)

(52) U.S. Cl.
CPC ............ *H04L 9/0852* (2013.01); *H01Q 3/26* (2013.01); *H01Q 3/28* (2013.01); *H01Q 3/34* (2013.01); *H01Q 3/38* (2013.01); *H01Q 21/00* (2013.01); *H04B 7/0413* (2013.01); *H04B 10/11* (2013.01); *H04B 10/516* (2013.01); *H04B 10/70* (2013.01);
(Continued)

(58) Field of Classification Search
CPC ............ H01Q 21/00; H01Q 3/26; H01Q 3/28; H01Q 3/34; H01Q 3/38; H04B 10/11; H04B 10/505; H04B 10/516; H04B 10/70; H04B 7/0413; H04J 14/0227; H04J 14/0298; H04J 14/04; H04L 27/345; H04L 27/3477;
(Continued)

(56) References Cited

U.S. PATENT DOCUMENTS

| 2012/0207470 A1* | 8/2012 | Djordjevic | H04B 10/25 398/44 |
| 2015/0372398 A1* | 12/2015 | Dudorov | H01Q 25/008 342/368 |
| 2017/0331532 A1* | 11/2017 | Le-Ngoc | H01Q 21/29 |

OTHER PUBLICATIONS

Djordjevic, et al., "Coded Orbital Angular Momentum Modulation and Multiplexing Enabling Ultra-High-Speed Free-Space Optical Transmission," Optical Wireless Communications—An Emerging Technology, (M. Uysal, C. Capsoni, Z. Ghassemlooy, A. Boucouvalas, E. G. Udvary, Editors) Springer, 2016, pp. 363-385.

(Continued)

*Primary Examiner* — Huy D Vu
*Assistant Examiner* — Nizam U Ahmed
(74) *Attorney, Agent, or Firm* — Joseph Kolodka

(57) ABSTRACT

Systems and methods for orbital angular momentum (OAM)-based multidimensional wireless communication. The OAM-based multidimensional wireless communication is preformed with a transmitter for generating an RF modulated signal carrying a data sequence. Further included is an OAM antenna array including OAM antenna elements, each of which includes an azimuthal phase shifter and an antenna element. The azimuthal phase shifter shifts an azimuthal phase term of a wavefront generated by the antenna element such that the OAM antenna element imposes the multidimensional modulated signal on a pre-determined OAM mode of a carrier signal corresponding to the azimuthal phase term.

20 Claims, 16 Drawing Sheets

(51) Int. Cl.
| | |
|---|---|
| H04J 14/02 | (2006.01) |
| H04B 10/11 | (2013.01) |
| H01Q 3/26 | (2006.01) |
| H01Q 3/28 | (2006.01) |
| H01Q 3/38 | (2006.01) |
| H04L 27/34 | (2006.01) |
| H04J 14/04 | (2006.01) |
| H04B 10/516 | (2013.01) |
| H01Q 3/34 | (2006.01) |
| H01Q 21/00 | (2006.01) |
| H04L 27/36 | (2006.01) |
| H04L 27/38 | (2006.01) |
| H04B 7/0413 | (2017.01) |
| H04B 10/50 | (2013.01) |

(52) U.S. Cl.
CPC .......... *H04J 14/0298* (2013.01); *H04J 14/04* (2013.01); *H04L 27/345* (2013.01); *H04L 27/3477* (2013.01); *H04L 27/36* (2013.01); *H04L 27/362* (2013.01); *H04L 27/38* (2013.01); *H04B 10/505* (2013.01); *H04J 14/0227* (2013.01)

(58) Field of Classification Search
CPC ....... H04L 27/36; H04L 27/362; H04L 27/38; H04L 9/0852
See application file for complete search history.

(56) References Cited

OTHER PUBLICATIONS

Djordjevic, et al., "Coded Orbital-Angular-Momentum-Based Free-Space Optical Transmission," Wiley Encyclopedia of Electrical and Electronics Engineering, Feb. 2016, 12 pages.
Djordjevic, et al.,"Error-Correction Coded Orbital-Angular-Momentum Modulation for FSO Channels Affected by Turbulence," IEEE/OSA J. Lightw. Technol., Sep. 2012, pp. 2846-2852, vol. 30, No. 17.
Djordjevic, et al., "Spatial-domain-based multidimensional modulation for multi-Tb/s serial optical transmission," Opt. Express, Mar. 2011, pp. 6845-6857, vol. 19, No. 7.
Djordjevic, et al.,"Multidimensional Signaling and Coding Enabling Multi-Tb/s Optical Transport and Networking," IEEE Sig. Proc. Mag., Mar. 2014, pp. 104-117, vol. 31, No. 2.
Djordjevic, et al., "Multidimensional Optical Transport Based on Optimized Vector-Quantization-Inspired Signal Constellation Design," IEEE Trans. Comm., Sep. 2014, pp. 3262-3273, vol. 62, No. 9.
Djordjevic, et al., "Design of DPSS based fiber bragg gratings and their application in all-optical encryption, OCDMA, optical steganography, and orthogonal-division multiplexing," Optics Express, May 2014, pp. 10882-1089, vol. 22, No. 9.
Djordjevic, "Energy-efficient spatial-domain-based hybrid multidimensional coded-modulations enabling multi-Tb/s optical transport," Optics Express, Aug. 2011, pp. 16708-16714, vol. 19, No. 17.
Djordjevic, et al., "Statistical physics inspired energy-efficient coded-modulation for optical communications," Optics Letters, Apr. 2012, pp. 1340-1342, vol. 37, No. 8.
Djordjevic, "On the Irregular Nonbinary QC-LDPC-Coded Hybrid Multidimensional OSCD-Modulation Enabling Beyond 100 Tb/s Optical Transport," IEEE/OSA J. Lightwave Technol., Aug. 2013, pp. 2969-2975, vol. 31, No. 16.
Sun, et al., "Physical-Layer Security in Orbital Angular Momentum Multiplexing Free-Space Optical Communications," IEEE Photonics Journal, Feb. 2016, pp. 1-10, vol. 8, No. 1.
Rossi, et al., "Future Space-based Communications Infrastructures based on High Throughput Satellites and Software Defined Networking," in Proc. 2015 IEEE International Symposium on Systems Engineering (ISSE), Sep. 2015, pp. 332-337.
Zheng, et al., "Transmission Characteristics of a Twisted Radio Wave Based on Circular Traveling-Wave Antenna," IEEE Transactions on Antennas and Propagation, Apr. 2015, pp. 1530-1536, vol. 63, No. 4.
Tamburini, et al., "Encoding many channels on the same frequency through radio vorticity: first experimental test," New J. Phys., Mar. 2012, pp. 033001-033017, vol. 14.
Hui, et al., "Multiplexed Millimeter Wave Communication with Dual Orbital Angular Momentum (OAM) Mode Antennas," Scientific Reports, May 2015, pp. 1-9, vol. 5.
Thide, et al., "Utilization of photon orbital angular momentum in the low-frequency radio domain," Phys. Rev. Lett., Aug. 2007, 4 pages, vol. 99.
Bai, et al., "Experimental circular phased array for generating OAM radio beams," Electron. Lett., Aug. 2004, pp. 1414-1415, vol. 50, No. 20.
Willner, et al., "Orbital Angular Momentum-based Wireless Communications: Designs and Implementations," Signal Processing for 5G: Algorithms and Implementations, 2005, pp. 296-318.
Verdu, "Multiuser Detection," Cambridge University Press, New York: 1998.
Djordjevic, et al., "On the communication over strong atmospheric turbulence channels by adaptive modulation and coding," Optics Express, Sep. 2009, pp. 18250-18262, vol. 17, No. 20.
Djordjevic, "Adaptive Modulation and Coding for Free-Space Optical Channels," IEEE/OSA J. Opt. Commun. Netw., May 2010, pp. 221-229, vol. 2, No. 5.
Djordjevic, et al., "On the Adaptive Sofware-Defined LDPC-Coded Multidimensional Spatial-MMIO Multiband Generalized OFDM Enabling Beyond 10-Tb/s Optical Transport," IEEE Photonics Journal, Feb. 2013, 8 pages, vol. 5, No. 1.
Djordjevic, "Integrated Optics Modules Based Proposal for Quantum Information Processing, Teleportation, QKD, and Quantum Error Correction Employing Photon Angular Momentum," IEEE Photonics Journal, Feb. 2016, pp. 6600212-1-6600212-12, vol. 8, No. 1.
Zhang, et al., "Improving the performance of the four-state continuous-variable quantum key distribution by using optical amplifiers," Physical Review A, Aug. 2012, pp. 022338-1-022338-7, vol. 86.
Xuan, et al., "A 24 km fiber-based discretely signaled continuous variable quantum key distribution system," Optics Express, Dec. 2009, pp. 24244-24249, vol. 17, No. 26.
Fossier, et al., "Field test of a continuous-variable quantum key distribution prototype," New Journal of Physics, Apr. 2009, 15 pages, vol. 11.
Jouguet, et al. "Preventing Calibration Attacks on the Local Oscillator in Continuous-Variable Quantum Key Distribution," Physical Review A, Jun. 2013, 7 pages, vol. 87, No. 6.
Qu, et al., "RF-subcarrier-assisted Four-state Continuous-variable QKD Based on Coherent Detection," Optics Letters, Dec. 2016, pp. 5507-5510, vol. 41, No. 23.
Biglieri, et al., "Principles of Cognitive Radio," Cambridge University Press, 2013.
Blahut, "Computation of Channel Capacity and Rate-Distortion Functions," IEEE Transactions on Information Theory, Jul. 1972, pp. 460-473, vol. IT-18, No. 4.
Bloch, et al., "Wireless Information-Theoretic Security," IEEE Transactions on Information Theory, Jun. 2008, pp. 2515-2534, vol. 54, No. 6.
Demestichas, et al., "5G on the Horizon: Key Challenges for the Radio-Access Network," IEEE Vehicular Technology Magazine, Sep. 2013, pp. 47-53, vol. 8, No. 3.
Hakiri, et al., "Leveraging SDN for the 5G networks: trends, prospects and challenges," Software Defined Mobil Networks; Beyond LTE Network Architecture (Series in Communications Networkings and Distributed Systems 2015), 978-1-118-90028-4, Jun. 2015, pp. 1-23.
Hossain, et al., "5G cellular: key enabling technologies and research challenges," IEEE Instrumentation & Measurement Magazine, Jun. 2015, pp. 11-21, vol. 18, No. 3.
Luby, "LT codes," Proc. IEEE Symposium on Fundations of Computer Science (FOCS02), 43, 2002.

(56) References Cited

OTHER PUBLICATIONS

Mackay, "Fountain codes," IEE Proceedings-Communications, Dec. 2005, pp. 1062-1068, vol. 152.

Palattella, et al., "Internet of Things in the 5G Era: Enablers, Architecture, and Business Models," IEEE Journal on Selected Areas in Communications, Mar. 2016, pp. 510-527, vol. 34, No. 3.

Shokrollahi, "Raptor codes," IEEE transactions on information theory, Jun. 2006, pp. 2551-2567, vol. 52.

Akrzewska, et al., "Towards converged 5G mobile networks—Challenges and current trends," ITU Kaleidoscope Academic Conference, Jun. 2014, pp. 39-45.

Talwar, et al., "Enabling technologies and architectures for 5G wireless," IEEE MTT-S International Microwave Symposium (IMS), Jun. 2014, pp. 1-4.

Cheng, et al., "Adaptive Photonics-Aided Coordinated Multipoint Transmissions for Next-Generation Mobile Fronthaul," Journal of Lightwave Technology, May 2014, pp. 1907-1914, vol. 32, No. 10.

Djordjevic, et al., "Spatial modes-based physical-layer security," Transparent Optical Networks (ICTON), 2016 18th International Conference on. IEEE, Jul. 2016, pp. 1-5.

Balanis, "Antenna Theory: Analysis and Design, 4th Edition," John Wiley & Sons, 2016.

Slepian, "Prolate spheroidal wave functions, Fourier analysis and uncertainty V, The discrete case," Bell Labs Technical Journal, May 1978, pp. 1373-1381, vol. 57, No. 5.

Anguita, et al., "Rateless coding on experimental temporally correlated FSO channels," IEEE/OSA J. Lightwave Technol., Apr. 2010, pp. 990-1002, vol. 28, No. 7.

Djordjevic, "Quantum Information Processing and Quantum Error Correction: An Engineering Approach," Elsevier/Academic Press, Apr. 2012.

Djordjevic, et al., "Coding for Optical Channels," Springer, Mar. 2010.

Huang, et al., "High-Speed Continuous-Variable Quantum Key Distribution without Sending a Local Oscillator," Opt. Letters, Aug. 2015, pp. 3695-3698, vol. 40, No. 16.

* cited by examiner

ANTENNA ARRAY BASED OAM WIRELESS COMMUNICATION

RELATED APPLICATION INFORMATION

This application claims priority to 62/459,688, filed on Feb. 16, 2017, incorporated herein by reference in its entirety. This application is related to U.S. Utility application Ser. No. 15/897,930 filed Feb. 15, 2018 entitled "MULTIDIMENSIONAL CODED MODULATION FOR WIRELESS COMMUNICATIONS WITH PHYSICAL LAYER SECURITY", and U.S. Utility application Ser. No. 15/897,930 filed Feb. 15, 2018 entitled "MULTIDIMENSIONAL CODED MODULATION FOR WIRELESS COMMUNICATIONS", both of which are incorporated by reference herein in their entirety.

BACKGROUND

Technical Field

The present invention relates to wireless communication and more particularly to wireless communications using orbital angular momentum with multidimensional coded modulation.

Description of the Related Art

In wireless communication and telecommunications, signals are communicated between transmitter and receiver by modulating a radio frequency (RF) signal. By multiplexing a RF signal over one or more degrees of freedom (DOF), multiple signals may be sent at the same time. Thus, multiplexing of signals effectively increases the aggregate throughput of a network.

However, as more and more bandwidth is demanded for wireless communication, the upper limits of currently implemented DOFs become restricting. These restrictions on bandwidth limitation, not only the speed and capacity of a network, but also the security of and the energy used by the wireless signals.

SUMMARY

According to an aspect of the present principles, a method is provided for orbital angular momentum (OAM)-based multidimensional wireless communication. The wireless communication system includes a transmitter for generating an RF modulated signal carrying a data sequence. Further included is an OAM antenna array including OAM antenna elements, each of the OAM antenna elements including an azimuthal phase shifter and an antenna element. The azimuthal phase shifter shifts an azimuthal phase term of a wavefront generated by the antenna element such that the OAM antenna element imposes the multidimensional modulated signal on a pre-determined OAM mode of a carrier signal corresponding to the azimuthal phase term.

According to another aspect of the present principles, a system is provided for orbital angular momentum (OAM)-based multidimensional wireless communication. The wireless communication method includes generating with a transmitter an RF modulated signal carrying a data sequence. The method further includes shifting an azimuthal phase term of a wavefront generated by the antenna element of an OAM antenna element in an OAM antenna array with an azimuthal phase shifter such that the OAM antenna element imposes the multidimensional modulated signal on a pre-determined OAM mode of a carrier signal corresponding to the azimuthal phase term.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
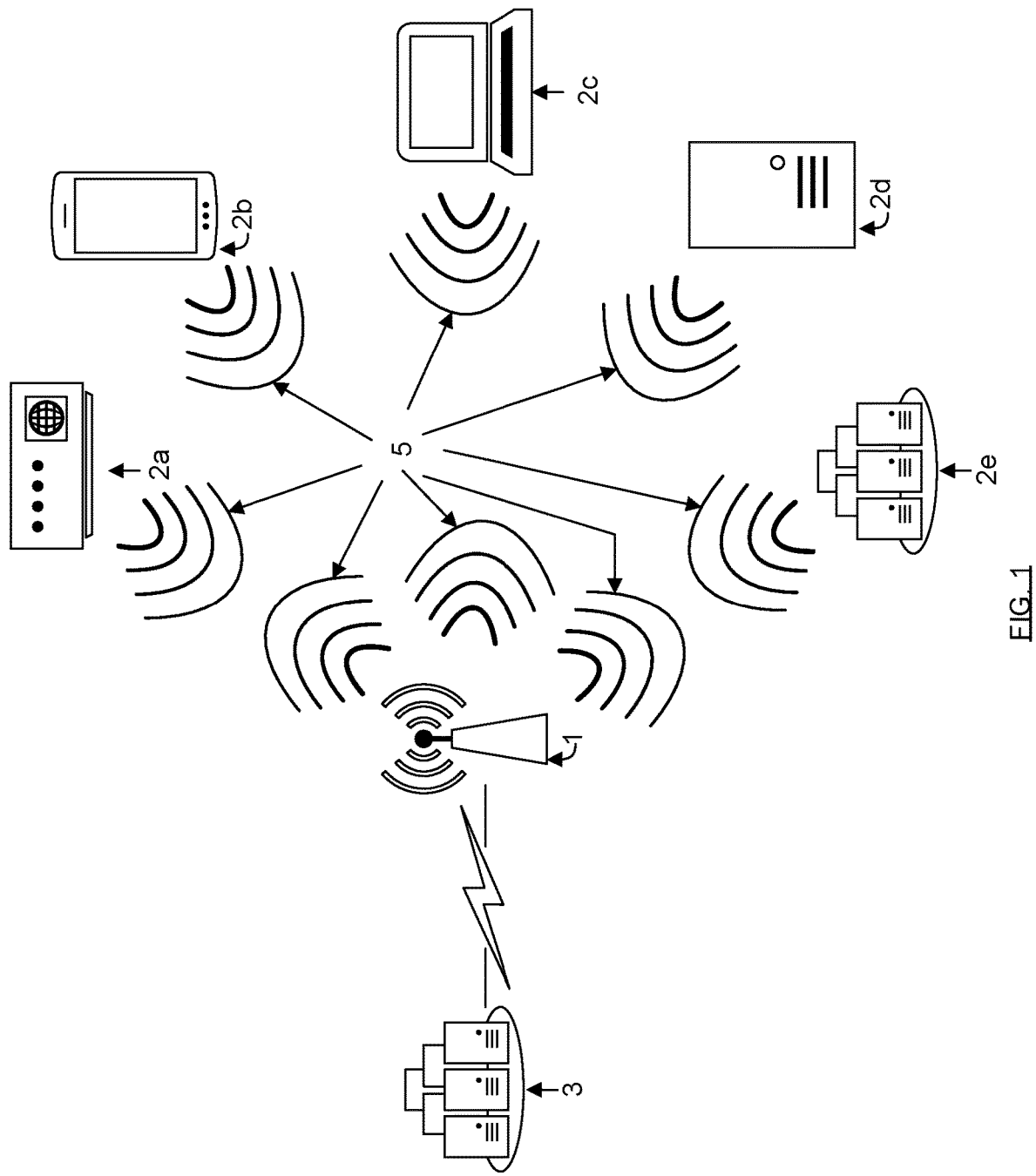
FIG. 1 is a block/flow diagram illustrating a high-level system/method for wireless communication with orbital angular momentum (OAM)-modes-enabled secure multidimensional coded modulation, in accordance with the present principles.

In accordance with the present principles, systems and methods are provided for wireless communication with orbital angular moment (OAM) based, secured, energy-efficient multidimensional coded modulation.

In one embodiment, challenges related to a higher bandwidth infrastructure are contemplated. As wireless communications demand greater bandwidth, infrastructure capacity must grow to accommodate that demand. One way of increasing the capacity of the infrastructure to accommodate increased bandwidth is by introducing another degree of freedom to a wireless link. More degrees of freedom in a wireless link permit a higher dimensional space for coding symbols to a signal constellation space by increasing the number of dimensions corresponding to the signal constellation space. Such an additional degree of freedom may include the orbital angular momentum (OAM) of a radio frequency (RF) signal.

By introducing OAM as a degree of freedom for signal transmission, signals may be multiplexed across RF channels such as an in-phase channel and a quadrature channel, as well as polarization states, and a desired number of OAM modes. Accordingly, a symbol can be coded to a signal constellation point in a relatively large constellation space including at least the above mentioned degrees of freedom. The high dimensional constellation space increases the amount of information that can be coded to the space, as well as increasing the accuracy of encoding and decoding the signal constellation point.

As a result, greater spectral efficiency, energy efficiency and security are contemplated by increasing the dimensionality of RF signals in wireless links, such as with the addition degrees of freedom corresponding to OAM modes. Thus, improved wireless communications utilizing OAM mode based wireless communication may be used for current and future wireless standards, such as 2G, 3G, 4G, 5G and beyond, as well as any other wireless communication standard.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a high-level system/method for wireless communication with OAM-modes-enabled secure multidimensional coded modulation is illustratively depicted in accordance with one embodiment of the present principles.

In one embodiment, included in a system for wireless communication is a wireless communication device 1. Wireless communication device 1 may include, e.g., a transmitter and/or receiver in communication with an antenna or antenna array for transmitting and/or receiving electromagnetic (EM) signals. Such EM signals may include, e.g., radio frequency (RF) signals, millimeter wave signals, terahertz (THz) signals, free-space optical (FSO) signals, or any other EM signal suitable for carrying information.

The wireless communication device 1 may be in communication with a data source 3 such as, e.g., a server or cloud server, a cloud computing system, data center, a virtual machine, a computer, or anything other suitable data device. The data source 3 provides the wireless communication device 1 with the signal to be transmitted. Alternatively, or in addition, the data source 3 may be a destination for a signal received by the wireless communication device 1. The data source 3 may be in communication with the wireless communication device 1 via a wireless connection, such as, e.g., RF or millimeter way, or FSO, or others, or by a wired connection, such as, e.g., copper wire, fiber, coaxial cables, superconductor connections, or any other connection suitable for carrying signals.

The wireless communication device 1 may then communicate the signal with other devices capable of communicating a corresponding wireless device, such as an antenna or antenna array. The other devices may include, for example, a router 2a, a smartphone or other mobile device 2b, a personal computer 2c, a server 2d or a database 2e, and any other device capable of communication via EM waves. As such, devices 2a-2e may include wireless communication devices similar to the wireless communication device 1, including, e.g., a transmitter and/or receiver in communication with an antenna or antenna array, such that the devices 2a-2e may wireless communication with the wireless communication device 1.

To permit communication with devices 2a-2e, the wireless communication device 1 may encode a signal according to aspects of the present invention. Accordingly, the wireless communication device 1 may encode the signal by leveraging all available degrees of freedom, including orbital angular momentum (OAM) of the EM wave being transmitted. The EM wave may be in the RF domain in which the signal is encoded using a multidimensional coded modulation scheme. The multidimensional coded modulation scheme may include multiplexing across an in-phase channel, a quadrature channel, passbands, polarization states and/or OAM modes. Accordingly, the signal may be multiplexed in a very large dimensional space including a combination of any of the above degrees of freedom. As will be described below, such a multiplexing scheme increases the spectral efficiency with greater tolerance to fading, multipath, interference effects, nonlinearities and other wireless transmission impairments.

Additionally, by multiplexing the signal with the wireless communication device 1 across more degrees of freedom with higher dimensionality, aggregate secrecy capacity may also be dramatically improved. Accordingly, as will be described below, wireless encryption schemes based on the greater degrees of freedom are possible for more secure signal encryption.

Furthermore, the increased degrees of freedom and higher dimensionality of the transmission from the wireless signal device 1 may permit improved physical-layer security at the wireless communication device 1 and/or the devices 2a-2e. For example, to provide unconditional security, subcarrier multiplexing based continuous variable quantum key distribution (CV-QKD) with reverse reconciliation over optical wireless communication 5 (OWC) links may leverage degrees of freedom such as, e.g., OAM modes, to improve secrecy capacity, bit error rate and secure key rates. These principles may also be applied to classical and semi-classical physical layer security schemes. Accordingly, as will be described below, the wireless communication device 1 and devices 2a-2e may have improved physical-layer security.

As another example, physical-layer security may be implemented in a flood-light quantum key distribution (FL-QKD). In FL-QKD, a transmitter may include a broadband amplified spontaneous emission (ASE) light source to generate correlated reference and signal light. An intended receiver employs the ASE non-modulated signal, modulates it, and sends it back as a returned message to the original transmitter. The other side may then employ a homodyne receiver to decode the returned message. A photon-pair source and three single-photon detectors (SPDs) are used to monitor an intruder attempting to intercept the returned message. By employing a microwave illumination approach, a mm-wave, THz wave or RF wave can be entangled with an optical beam. Employing FL-QKD with microwave illumination multi-Gb/s secure key rates over mm-wave/THz/RF links can be achieved. In this scenario, the weak optical beam is used to monitor the intruder, while mm-wave/THz/RF link is used for raw-key transmission.

The wireless communication device 1 may implement greater degrees of freedom by, for example, multiplexing across OAM modes. OAM modes leverage a helical wavefront, such as a Laguerre-Gaussian (LG) vortex beam, produced by an antenna or antenna array to generate a nonzero angular momentum J, according to equation 1 below:

$$J = \frac{1}{4\pi c}\int_V E \times A \, dV + \frac{1}{4\pi c}\int_V \sum_{k=x,y,z}(r\times\nabla)A_k \, dV, \quad \text{Equation 1}$$

where J is the angular momentum of an electromagnetic (EM) field, c is the speed of light, E is the electric field intensity, A is the vector potential, r is the radius of the EM field, $\nabla$ is the del operator, and V is the volume in which propagation is observed.

The vector potential, A, of a vortex beam imposed by a circular traveling-wave antenna or circular array antenna may be determined based on equation 2 below;

$$A(r) = \frac{\mu_0 I_0}{4\pi}\int_L e^{jl\phi}\frac{e^{jk|r-r'|}}{|r-r'|}dl' \cong \frac{(-j)^{-1}a}{r}\frac{\mu_0 I_0 e^{jkr}}{4}e^{jl\phi} \quad \text{Equation 2}$$

$$J_{l-1}(ka\sin\theta)[\sin\theta\,\hat{r}+\cos\theta\,\hat{\theta}+j\hat{\phi}]+\frac{(-j)^{-1}a}{r}$$

$$\frac{\mu_0 I_0 e^{jkr}}{4}e^{jl\phi}J_{l+1}(ka\sin\theta)[\sin\theta\,\hat{r}+\cos\theta\,\hat{\theta}-j\hat{\phi}],$$

where $e^{jl\phi}$ corresponds to the azimuthal phase dependence of the l-th OAM mode of the vector potential, a is the radius of a circular antenna, µ is the free space permeability, k is the propagation constant equal to $2\pi/\lambda$ where $\lambda$ is the wavelength, and $\theta$ and $\phi$ are spherical coordinates.

For optical wireless communication 5 (OWC), including outdoor FSO links, the LG(p,m) beams can be used. Given that an LG beam has both a radial mode p and an angular mode m, the radial mode p may be held constant due to rotational symmetry, thus resulting in all OAM modes m being mutually orthogonal.

For circular antenna arrays and circular-traveling wave antennas, equation 2 may be substituted into equation 1, resulting in equation 3 below:

$$L_z = \varepsilon_0\int_0^{2\pi}d\phi\iint Re\{jE^*(\hat{L}\cdot A)\}\rho d\rho dz, \quad \hat{L}=-j(r\times\nabla), \quad \text{Equation 3:}$$

where $\hat{L}$ is the angular momentum operator, Re indicates real component of a complex number, j is the imaginary unit, and $\rho$ and z are cylindrical coordinates.

As a result of the above, a suitable antenna or antenna array, such as, e.g., a circular traveling-wave antenna, a spiral parabolic antenna, or a dual mode antenna may be used to generate an RF carrier wave having a desired angular momentum. For example, by using a circular antenna array as the wireless communication device 1, the circular antenna may be divided into N segments, with each segment having an incremental phase shift of $2\pi l/N$, with l corresponding to a desired angular OAM mode. Accordingly, the same RF signal may be produced at each segment, but with a different one of the l OAM modes. Accordingly, the wireless communication device 1 may be used to generate a signal multiplexed across OAM modes.

OAM antenna array may be used in the wireless communication device 1, such as, e.g., a circular antenna array, described above, or linear antenna array. In the antenna array, an antenna array element produces a corresponding electric field characterized by equation 4 below:

$$E_0 = \frac{I_0}{4\pi} \frac{e^{-jkr}}{r},$$ Equation 4 where $E_0$ is the electrical field for far field, $I_0$ is the current magnitude applied to the antenna array, j is the imaginary unit, k is the wave number, and r is the distance from the origin. For a linear antenna array, placed along z-axis, having (2N+1) linear elements, the distances of observed point in far-field from the array elements are defined by r±nd cos θ where n is the array element index (n=-N, ..., -1, 0, 1, ..., N), d is the distance between two neighboring array elements, and θ is the zenith angle.

For a wireless communication device 1 including such an antenna array, a symbol $I_n$ may be passed from a transmitter to the antenna array for transmission by array element n. The n-th array element may therefore create a signal having a complex amplitude according to equation 5 below:

$$I(n) = I_n e^{j\phi_n},$$ Equation 5:

where I is the complex amplitude, n is the array element, j is the imaginary unit, and $\phi_n$ is an azimuthal phase shift of the signal.

In an antenna array that the azimuthal phase shift at the m-th element $\phi_m$ may be set to be equal to mφ, wherein the spiral phase plate (SPP) may be used to introduce the desired azimuthal phase shift. By applying the superposition principle for the entire antenna array, the far field for electric field of the antenna array can be determined according to equation 6 below:

$$E_\theta = \frac{1}{4\pi} \frac{e^{-jkr}}{r} \sum_{m=-N+1}^{N-1} I_m e^{jm\phi} e^{jkmd\cos\theta},$$ Equation 6 where $e^{jm\phi}$ is an azimuthal phase term of the wavefront. Accordingly, the antenna array itself may multiplex 2N+1 independent signals, with m-th (m=-N, ..., 0, 1, ..., N) wireless signal being imposed on the m-th OAM mode exp(jmφ). Thus the generated OAM mode is governed by this azimuthal phase term.

The m-th transmit array antenna element may be implemented as a radiative element having an integrated SPP to introduce the azimuthal phase shift of $\phi_m = m\phi$. Namely, to introduce the m-th OAM mode we need to azimuthally vary the thickness of the SPP according to equation 7 below:

$$h(m\phi) = m\phi\lambda[2\pi(n-1)],$$ Equation 7:

where n is the refractive index of material and λ is the operating wavelength. Therefore, required azimuthally varied thickness of the SPP to introduce m-th OAM modes will be m times larger than that of OAM mode 1.

However, a receive antenna array may be used to serve as an OAM demultiplexer. The receiving OAM antenna element may introduce complex-conjugate magnitude of $e^{-jm\phi}$.

Accordingly, the n-th antenna array element of a receiving antenna may detect the n-th (n=-N, ..., -1, 0, 1, ..., N) wireless signal corresponding to equation 8 below:

$$E_n = \frac{1}{2\pi} \int_0^{2\pi} e^{-jn\phi} \frac{1}{4\pi} \frac{e^{-jkr}}{r} \sum_{m=-N+1}^{N-1} I_m e^{jm\phi} e^{jkmd\cos\theta} =$$ Equation 8

$$\frac{1}{4\pi} \frac{e^{-jkr}}{r} I_n e^{jknd\cos\theta}.$$

Accordingly, the received signal is proportional to the current magnitude for the symbol $I_n$. Thus, the symbol conveyed at each OAM mode is detectable by the properly designed receive antenna array. Similar to the transmitter side, the n-th receive antenna array element can also be implemented as a receive antenna element integrated together with a SPP, which will now introduce the azimuthal phase shift of -nφ. This phase plate will detect only the n-th OAM and reject the other OAM modes, effectively performing the action described by Equation 8.

As a result, the wireless communication device 1 may, therefore, be either antenna including, e.g., a circular traveling wave antenna, spiral parabolic antenna, dual mode antenna, or other suitable antenna, or it may be an antenna array, such as, e.g., a circular antenna array, linear antenna array, planar antenna array, or conformal antenna array, or other suitable antenna array. Such antennas may be used to convey symbols by multiplexing symbols across OAM modes generated by the wireless communication device 1.

Figure 2:
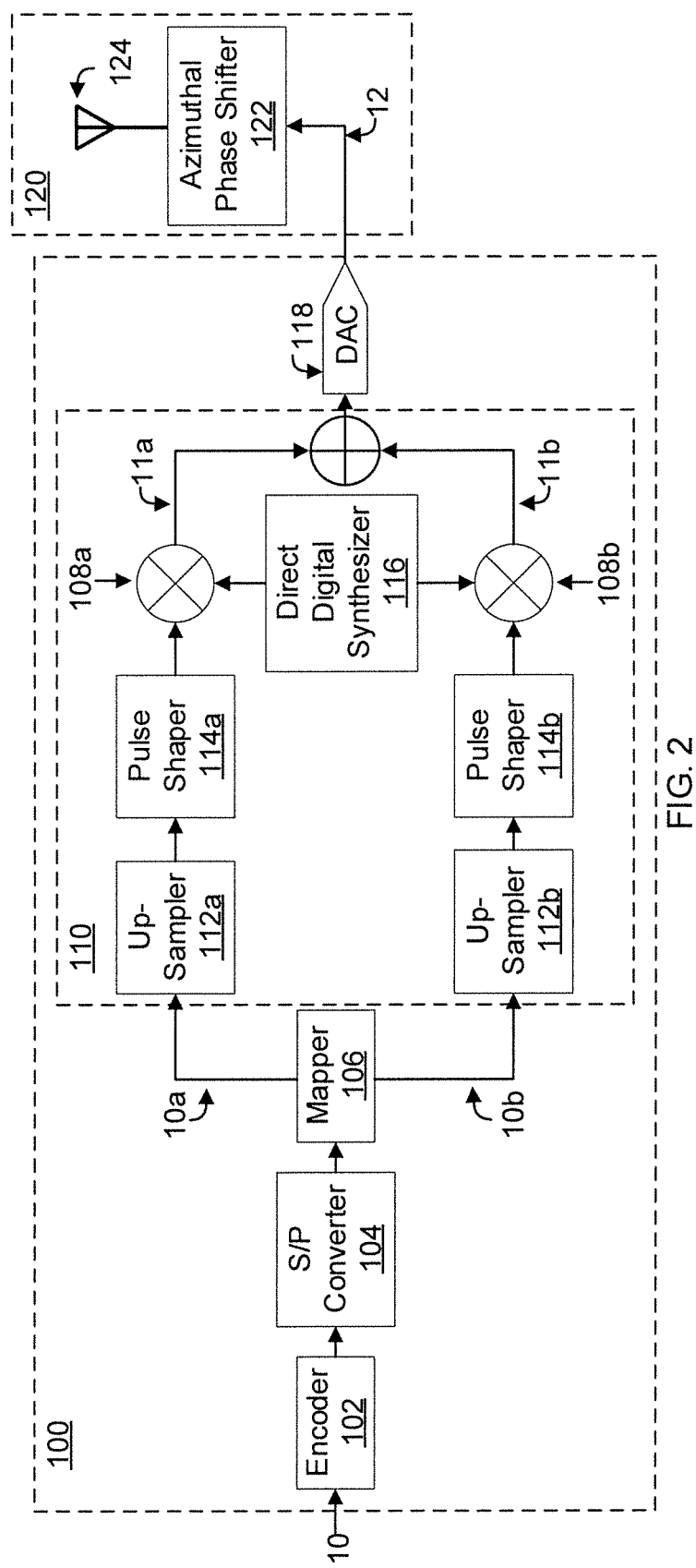
FIG. 2 is a block/flow diagram illustrating a system/method for a transmitter and antenna array element for wireless communication with OAM-modes-enabled secure multidimensional coded modulation, in accordance with the present principles.

Referring now to FIG. 2, a RF transmitter and an antenna array element for wireless communication with OAM-modes-enabled secure multidimensional coded modulation is illustratively depicted in accordance with one embodiment of the present principles.

According to aspects of the present invention, wireless communication may be performed using transmit electronics, including e.g., a transmitter 100 which may be configured to transmit a sequence of symbols 10 via a transmit OAM antenna element 120 of a transmit OAM antenna array. The transmitter 100 may include an encoder 102. The encoder 102 may be configured as, e.g., a low-density parity check (LDPC) encoder, however other types of encoders are contemplated, such as turbo-product encoder. The encoder 102 may encode the symbol sequence 10 and send the encoded sequence to a serial to parallel (S/P) converter 104.

The S/P converter 104 may be configured to convert a serial stream of symbols from the symbol sequence 10 into multiple parallel streams. For M symbols, the S/P converter 104 will generate $\log_2(M)$ bits. These bits corresponding to the encoded and converted symbol sequence 10 may then be mapped to a 2-dimensional constellation space by a 2-D mapper 106. The mapping may be embodied as, e.g., a look-up table (LUT), but other methods are possible, such as an algorithm based mapping or other suitable mapping methods. Accordingly, each symbol in the sequence of symbols 10, upon encoding and conversion, is mapped to a 2-dimensional signal constellation.

The signal constellation for the original symbol sequence 10 may be multiplexed across multiple channels. For example, the mapped sequence may be multiplexed across two channels, such as, e.g., an in-phase channel and a quadrature channel. Accordingly, the signal constellation coordinates for the symbol sequence 10 are split between an in-phase channel 10a and quadrature channel 10b after mapping at the mapper 106. The in-phase and quadrature channels 10a and 10b may then undergo modulation process by a discrete-time (DT) modulator 110. The DT modulator 110 may include modulation components to prepare the channels 10a and 10b for transmission, including, e.g., up-samplers 112a and 112b, pulse shapers 114a and 114b and a direct digital synthesizer 116.

According to an embodiment of the present invention, both of the in-phase channel 10a and the quadrature channel 10b be prepared for phase modulation and quadrature amplitude modulation, respectively by the modulator 110. Accordingly, each channel 10a and 10b may be up-sampled from the original sample rate by an in-phase up-sampler 112a and a quadrature up-sampler 112b respectively.

Each channel 10a and 10b may subsequently be pulse shaped by corresponding filters, such as, e.g. an in-phase pulse shaper 114a and quadrature pulse shaper 114b, respectively. The pulse shapers 114a and 114b may shape pulses corresponding to the up-sampled symbols by performing a discrete-time (DT) convolution sum of the up-sampled signals 10a and 10b, and an impulse response at the pulse shapers 114a and 114b. The impulse response may be a function of the sampling period T of signals 10a and 10b. Accordingly, in-phase and quadrature DT pulses are obtained for each constellation coordinate.

The DT pulses may then be modulated by baseband functions in order to further improve the spectral efficiency, such as, e.g., by Slepian sequence baseband functions. The baseband functions may be applied by a component such as, e.g., a direct digital synthesizer 116. The direct digital synthesizer 116 may generate an in-phase DT carrier and a quadrature DT carrier. When combined using mixers 108a and 108b with the in-phase DT pulses and the quadrature DT pulses, respectively, the pulses modulate the DT carriers to form in-phase signals 11a and quadrature signals 11b, respectively.

The in-phase and quadrature signals 11a and 11b may then be combined and converted to analog-domain by a digital analog converter (DAC) 118 into a quadrature multiplexed signal 12. Accordingly, each symbol sequence 10 may be up-converted as described above. Alternatively, the block 110 may serve as discrete-time in-phase/quadrature (I/Q) modulator for any 2-D signal constellation. Each RF multiplexed/2-D modulated signal 12 may then be communicated to an antenna array, with corresponding antenna array element represented by 120, such as those discussed above. The transmit OAM antenna element 120 may be a single antenna; however, according to aspects of the present embodiment, there may be several transmit OAM antenna elements 120, each imposing a pre-determined OAM mode. The transmit OAM antenna element 120 thus may operate as discussed above, with an OAM mode being generated by a given radiative antenna element 124. An azimuthal phase shifter 122 may be used to impose the OAM mode to be transmitted by the radiative antenna element 124. As discussed above, the azimuthal phase shifter 122 may include a SPP for imposing a pre-determined azimuthal phase shift. The azimuthal phase shifter 122 may impose the OAM mode according to the azimuthal phase $e^{jm\phi}$ to ensure a distinct OAM mode is produced at the radiative antenna element 124. As a result, the transmitter 100 and transmit OAM antenna element 120 may generate and send an RF signal corresponding to a particular symbol sequence 10 over a pre-determined OAM mode.

Figure 3:
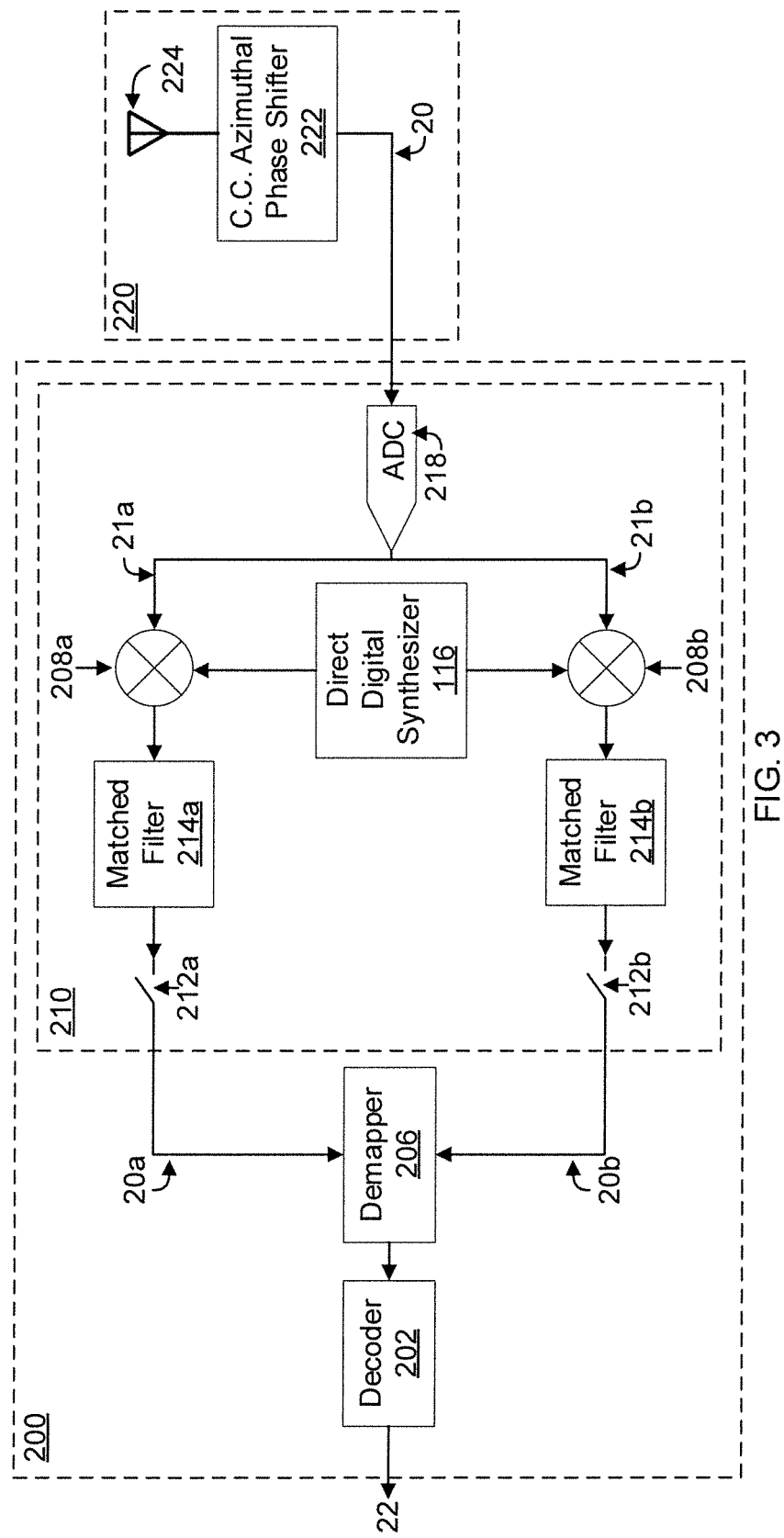
FIG. 3 is a flow diagram illustrating a system/method for a receiver for wireless communication with OAM-modes-enabled secure multidimensional coded modulation, in accordance with the present principles.

Referring now to FIG. 3, a receiver for wireless communication with OAM-modes-enabled secure multidimensional coded modulation is illustratively depicted in accordance with one embodiment of the present principles.

According to aspects of the invention, wireless communication may be performed using a receive OAM antenna element 220 and receive electronics such as, e.g., a RF receiver 200 are contemplated for receiving a signal corresponding to a pre-determined OAM mode. To permit reception of the OAM mode carrying a signal, the receive OAM antenna element 220 may include a receive antenna element 224 together with a complex-conjugate (c.c.) azimuthal phase shifter 222. Similar to the transmit OAM antenna element 120 discussed above, the receive OAM antenna element 220, according to aspects of the invention, may be combined with other receive OAM antenna elements to form the OAM demultiplexer. The receive antenna element 224 may therefore be configured to receive a given OAM mode according to the c.c. azimuthal phase shifter 222. The c.c. azimuthal phase shifter 222 provides the projection along a desired OAM mode basis function. As a result, the c.c. azimuthal phase shifter 222 detects the n-th OAM mode. Similar to the azimuthal phase shifter 122 of the transmit OAM antenna element 120 described above, the c.c. azimuthal phase shifter 222 may include a SPP to implement an azimuthal phase shift.

According to aspects of the invention, once a projection of the received signal 20 has been generated from the receive antenna element 224, the projection may be demodulated by demodulator 210 corresponding to the RF receiver 200, starting with an analog-to-digital converter (ADC) 218. The demodulator 210 may include demodulation components, such as a direct digital synthesizer 216, matched filters 214a and 214b and samplers 212a and 212b.

The ADC 218 may receive the OAM projection and convert it into digital form. As a result, digital signals 21a and 21b are generated. The digital signals 21a and 21b may be separated into an in-phase channel 21a and a quadrature channel 21b.

Each channel 21a and 21b may be down-converted with by employing, e.g., a direct digital synthesizer 216. The direct digital synthesizer 216 may be configured to generate cosine and sine waveforms, and thus perform down-conversion together with mixers (multipliers) 208a and 208b. Accordingly, the direct digital synthesizer 216 together with mixers 208a and 208b demodulates each channel 21a and 21b by removing the DT carrier from the received signal 21.

The resulting pulses from the demodulated in-phase and quadrature channels 21a and 21b may then be down-sampled by samplers 212a and 212b respectively, thus performing opposite operation from that on transmitter side. The down-sampled values may therefore provide estimates of constellation points provided in the received signal 20. Accordingly, the constellation point corresponding to each sample may be demapped using a demapper 206.

The demapper 206 may be an a posteriori probability (APP) demapper. Accordingly, the signal samples provided by the in-phase and quadrature channels 20a and 20b may be analyzed with a posteriori probability detector by calculating symbol log-likelihood ratios (LLRs). The LLRs will provide a most likely estimate of a transmitted symbol constellation point by selecting the symbol corresponding to the maximum LLR. As a result, the demapper 206 may calculate the most likely symbols corresponding to the LLRs. The LLR get passed to the nonbinary decoder. If binary decoder is used, the bit LLRs must be calculated first from symbol LLRs.

Upon calculating the bit LLRs, a binary LDPC decoder 202 may decode the bit stream of bit LLRs from both of the demapped in-phase channel 20*a* and quadrature channel 20*b*. This decoding results in a reliable estimate of the transmitted sequence.

Accordingly, a sequence of symbols carried by an OAM mode may be received and demodulated by the receive OAM antenna element 220 and RF receiver 200 to determine the original sequence.

Figure 4:
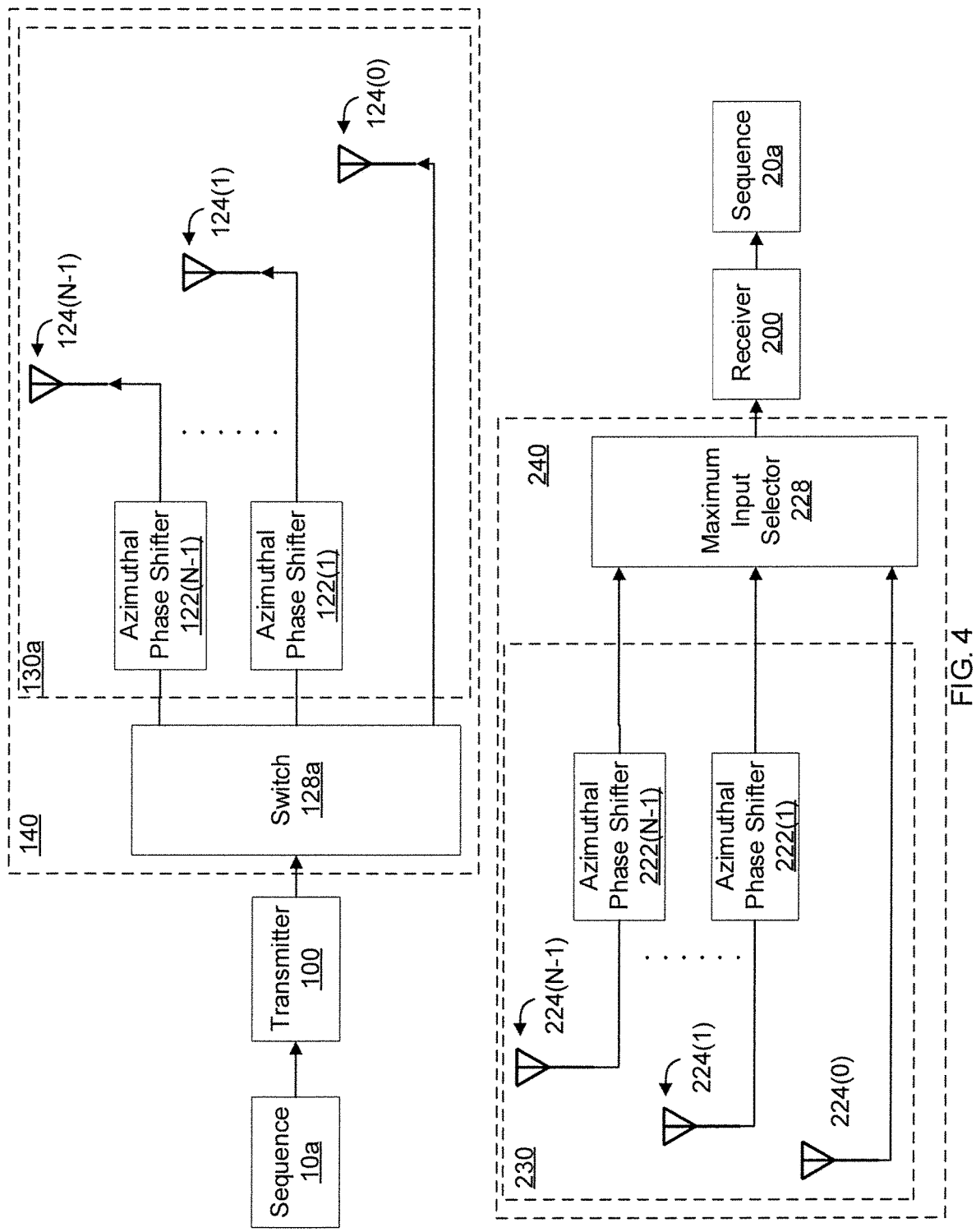
FIG. 4 is a block/flow diagram illustrating a system/method for an encryption scheme for a wireless communication with OAM-modes-enabled secure multidimensional coded modulation, in accordance with the present principles.

Referring now to FIG. 4, an encryption scheme for a wireless communication with OAM-modes-enabled secure multidimensional coded modulation is illustratively depicted in accordance with one embodiment of the present principles.

According to aspects of the invention, transmit electronics, such as, e.g., a transmitter 100 and an OAM encryption stage 140 including a transmit OAM antenna array 130*a* may be configured to provide OAM-based encrypted wireless communications with the help of switch 128*a*. To permit encryption in an OAM-based manner, the OAM encryption stage is composed of a switch 128*a* and an OAM antenna array 130*a*. However, the switch 128*a* may instead be a part of the transmitter 100 or it may be an independent component. Alternatively, the switch 128*a* and the OAM antenna array 130*a* may be replaced by an adaptive, reconfigurable, OAM antenna element.

An input sequence 10*a* including user data may be encoded and modulated by a RF transmitter 100, such as a transmitter 100 discussed above. The modulated signal may then be communicated to the switch 128*a* at the transmit OAM antenna array 130*a*. The switch 128*a* may be configured to randomly select a radiative antenna element 124(0) through 124(N−1) such that the selected radiative antenna element yields a non-negative OAM basis function (i.e. $e^{jn\Phi}$, n=0, 1, . . . , N−1). These radiative antenna elements 124(0) through 124(N−1) form transmit OAM antenna elements with non-phase shifted radiative antenna element 124(0) or an azimuthal phase shifter 122(1) through 122(N−1) having a positive index (i.e., a non-negative index). As a result, an unpredictable OAM mode will be used to carry the transmitted signal.

The transmitted signal may then be received by a receive OAM antenna array 230. The receive OAM antenna array 230 may include receive antenna elements 224(0) through 224(N−1), each of which has been followed by a complex-conjugate (c.c.) azimuthal phase shifter 222(1) through 222(N−1) with a corresponding index to each of the radiative antenna elements 124(0) through 124(N−1), thus forming receive OAM antenna elements. For example, as described above, the radiative antenna elements 124(0) through 124(N−1) may have non-negative indices. To reconstruct the signal carried in the OAM mode, the c.c. azimuthal phase shifters 222(1) through 222(N−1) for the receive antenna elements 224(1) through 224(N−1), respectively, may be complex conjugates to each of the radiative antenna elements 124(1) through 124(N−1), and thus have non-positive phase shift indices. Because radiative antenna element 124(0), for example, has no phase shift, receive antenna element 224(0) likewise needs no phase shift.

Because the signal is carried by only a single OAM mode, the correct OAM mode carrying the signal must be found. Since each OAM mode is generated by a separate radiative antenna element 124(0) through 124(N−1), the OAM mode carrying the signal will have a unique complex index imposed by the correct radiative antenna element 124(0) through 124(N−1). As a result, only the receive antenna element 224(0) through 224(N−1) with the correct complex conjugate index corresponding the OAM mode carrying the signal will produce a signal peak. The remaining elements will output only noise. Therefore, a maximum input selector 228 may be used to determine which receive antenna element 224(0) through 224(N−1) generates an output with a strong signal peak. The output corresponding the strong signal peak will be determined by the maximum input selector 228 as the correct output.

Upon determining the correct output, the maximum input selector 228 may communicate the output to receive electronics, such as, e.g., a receiver 200 to be demodulated by a demodulator such as the one described above. Accordingly, the receiver 200 will reconstruct the most likely sequence 20*a* from the transmitted OAM mode corresponding to the user data 10*a*. Accordingly, the user data 10*a* may be transmitted in a secure, encrypted fashion.

Alternatively, the switch and the antenna array may be replaced with an adaptive, reconfigurable, OAM antenna element, which can detect the signal transmitted over wireless link by performing the correct complex-conjugate OAM mode. This approach requires the pre-sharing an initial seed between the transmitter and the receiver. For example, the reconfigurable SPP can be tuned by changing the thickness by thermal and/or piezoelectric means.

Figure 5:
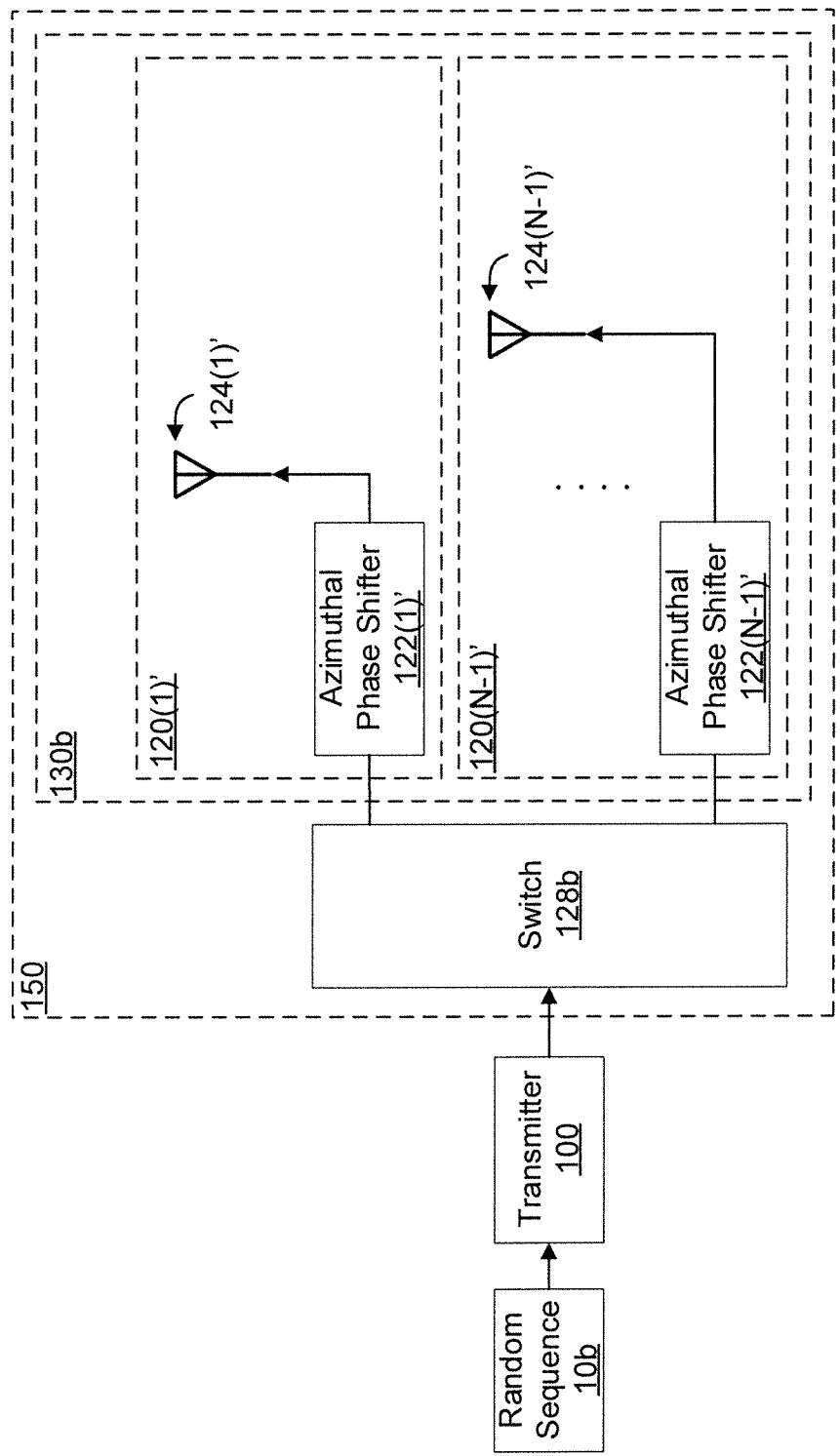
FIG. 5 is a block/flow diagram illustrating a system/method for a masking scheme for a wireless communication with OAM-modes-enabled secure multidimensional coded modulation, in accordance with the present principles.

Referring now to FIG. 5, a masking scheme for a wireless communication with OAM-modes-enabled secure multidimensional coded modulation is illustratively depicted in accordance with one embodiment of the present principles.

According to aspects of the present invention, OAM-based secure communication may include masking data with noisy transmissions. For example, a transmitter 100 may include an OAM masking stage 150 for generating an OAM carrier signal containing a random sequence 10*b* of information using a masking OAM antenna array 130*b*. The random sequence 10*b* may be generated by, e.g., a Gaussian random generator. The Gaussian random generator may be a separate component, or it may be a part of the transmitter 100. Because the random sequence 10*b* is generated by a Gaussian random generator, no LDPC encoder is necessary for the random sequence 10*b*. However, other methods of generating a random noisy sequence are contemplated.

As discussed above, a transmitter 100 may multiplex the random sequence 10*b* across RF domains, such as in-phase channels and quadrature channels. However, the random sequence 10*b* could also skip multiplexing across RF domains. The transmitter 100 may then communicate the random sequence 10*b* to the masking OAM antenna array 130*b* via a switch 128*b*. The switch 128*b* may select one or more of masking radiative antenna elements 124(1)' through 124(N−1)' to generate a signal in an OAM mode or a superposition of OAM modes.

To generate the OAM mode that will carry the signal, the random sequence 10*b* may be imposed on different OAM modes by one or more masking OAM antenna elements including one or more of azimuthal phase shifters 122(1)' through 122(N−1)' corresponding to the selected masking radiative antenna elements 124(1)' through 124(N−1)'. Accordingly, the random sequence 10*b* may be applied to particular OAM modes to carry the random noisy sequence 10*b*.

By generating an OAM mode carrier for the random sequence 10*b*, a signal of Gaussian randomly generated data (Gaussian noise) is transmitted with particular OAM modes. The Gaussian noise may be transmitted concurrently with an actual data signal, such as described above. The actual data signal may be encrypted or unencrypted, such as through systems and methods described above. As a result, the Gaussian noise may mask the actual data signal by obfuscating any data structure in both time and frequency domains.

The masking radiative antenna elements 124(1)' through 124(N−1)' may be configured to only generate signals having negative OAM indices (such as, e.g., $e^{-jm\Phi}$). Because OAM basis functions are orthogonal, the de-masking stage is not needed on receiver side, the data receiving OAM antenna element array will not receive the noisy signal, but only the signal from data carrying waves from antenna elements having the correct complex conjugates. As a result, the noise is filtered out at the receiver without the need for any additional equipment.

Accordingly, a data carrying OAM mode or modes may be accompanied by one or more noise sources carrying OAM modes for masking in the time- and frequency-domains. The data carrying OAM mode or modes may be either encrypted or unencrypted. A receiver may then be used to automatically filter out the noise carrying OAM modes.

Figure 6:
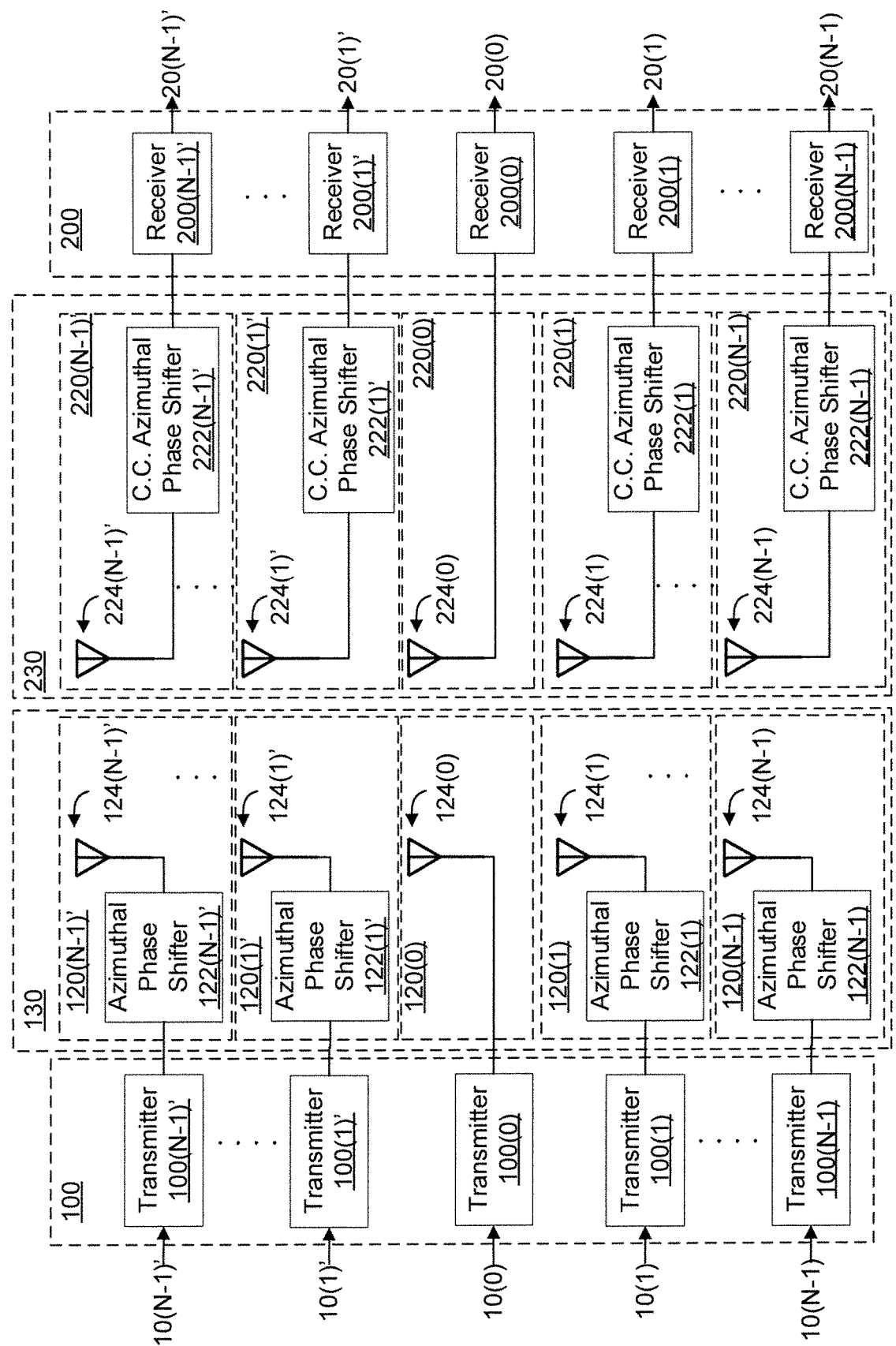
FIG. 6 is a block/flow diagram illustrating a system/method for an antenna array configuration for OAM multiplexing and demultiplexing, in accordance with the present principles.

Referring now to FIG. 6, a transmit antenna array configuration for OAM multiplexing and a receive antenna array for OAM demultiplexing are illustratively depicted in accordance with one embodiment of the present principles.

According to aspects of the invention, a transmit OAM antenna array 130 including multiple OAM antenna elements 120(N−1)' through 120(N−1) having corresponding radiative antenna elements 124(N−1)' through 124(N−1) and azimuthal phase shifters 122(N−1)' through 122(N−1), each corresponding to a transmitter 100(N−1)' through 100(N−1), may be used to multiplex signals across OAM modes. Each radiative antenna element of the radiative antenna elements 124(N−1)' through 124(N−1) will generate a different OAM mode. Each OAM mode may also correspond to an OAM basis function governing its generation $e^{jm\Phi}$. The OAM modes that may be generated may include both positive and negative OAM mode indices. As a result, since in basis functions $e^{jm\Phi}$, the azimuthal index m=−N, . . . , −1, 0, 1, . . . , N, there are 2N+1 OAM modes. As a result, there will likewise be 2N+1 transmit antenna radiative elements (i.e., 124(N−1), . . . , 124(1), 124(0), 124(1)', . . . , 124(N−1)') and 2N+1 set of transmit electronics, such as, e.g., transmitters (i.e., 100(N−1), . . . , 100(1), 100(0), 100(1)', . . . , 100(N−1)').

A data sequence, such as data sequence 10(N−1) may be communicated to transmit electronics, such as, e.g., a RF transmitter 100, including transmitter 100(N−1). The transmitter 100(N−1) may be a transmitter such as, e.g., the RF transmitter described above. The transmitter 100(N−1) may therefore, prepare the data sequence 10(N−1) for transmission through the transmit OAM antenna array 130. In doing so, the transmitter 100(N−1) may, for example, modulate the data sequence 10(N−1) across an in-phase channel and a quadrature channel.

Once the data sequence 10(N−1) is prepared for transmission, the data sequence is passed to the transmit OAM antenna array 130 to be azimuthal phase shifted by a transmit azimuthal phase shifter 122(N−1), such as, e.g. an SPP described above. The transmit azimuthal phase shifter 122(N−1) will impose the data sequence on the corresponding OAM mode followed by the radiative antenna element 124(N−1). The combination of the azimuthal phase shifter 122(N−1) and radiative antenna element 124(N−1) form a transmit OAM antenna element 120(N−1). Accordingly, an OAM mode is generated by the radiative antenna element 124(N−1) according to the phase shift by the transmit azimuthal phase shifter 122(N−1). This OAM mode may carry the data sequence 10(N−1). Because OAM modes are mutually orthogonal, the 2N+1 OAM modes carrying each of the data sequences (i.e. 10(N−1), . . . , 10(1), 10(0), 10(1)', . . . , 10(N−1)') may be independent from one another, and thus separately generated and received. As a result, the transmitter 100 and transmit OAM antenna array 120 may multiplex 2N+1 independent data sequences across OAM modes.

Accordingly, the RF transmitter 100 and transmit OAM antenna array 130 may have a corresponding receive OAM antenna array 230 and receiver 200. Similar to the transmitter 100 and transmit OAM antenna array 130, the receive OAM antenna element array 230 and the receiver 200 may have 2N+1 receive OAM antenna elements 220(N−1), . . . , 220(1), 220(0), 220(1)', . . . , and 220(N−1)' and 2N+1 receive electronics, such as, e.g., RF receivers 200(N−1), . . . , 200(1), 200(0), 200(1)', . . . , and 200(N−1)', respectively. Each receive OAM antenna elements 220(N−1), . . . , 220(1), 220(0), 220(1)', . . . , and 220(N−1)' includes corresponding receive antenna elements 224(N−1), . . . , 224(1), 224(0), 224(1)', . . . , and 224(N−1)' followed by corresponding c.c. azimuthal phase shifters 222(N−1), . . . , 222(1), 222(1)', . . . , and 222(N−1)' according to an OAM basis function index that is a complex conjugate to the index of each corresponding radiative antenna element 124(N−1), . . . , 124(1), 124(0), 124(1)', . . . , and 124(N−1)'. As a result, each receive antenna element 224(N−1), . . . , 224(1), 224(0), 224(1)', . . . , and 224(N−1)' may detect an independent and orthogonal OAM mode. The combination of each receive antenna element 224(N−1), . . . , 224(1), 224(0), 224(1)', . . . , and 224(N−1)' with corresponding c.c. azimuthal phase shifter 222(N−1), . . . , 222(1), 222(1)', . . . , and 222(N−1)' forms a receive OAM antenna element of the receive OAM antenna array 230.

For example, when radiative antenna element 124(N−1) generates and transmits an OAM mode having the index $e^{j(N-1)\Phi}$ and carrying data sequence 10(N−1), a receive antenna element 224(N−1) may be configured to detect that OAM mode using the complex conjugate index of $e^{-j(N-1)\Phi}$. Each receive antenna element 224(N−1), . . . , 224(1), 224(0), 224(1)', . . . , and 224(N−1)' may similarly be configured to receive the OAM mode carrying each respective data sequence 10(N−1), . . . , 10(1), 10(0), 10(1)', . . . , 10(N−1)'. As a result, data sequences from a different user gets demultiplexed from across OAM modes, thus reproducing the original transmitted data.

Figure 7:
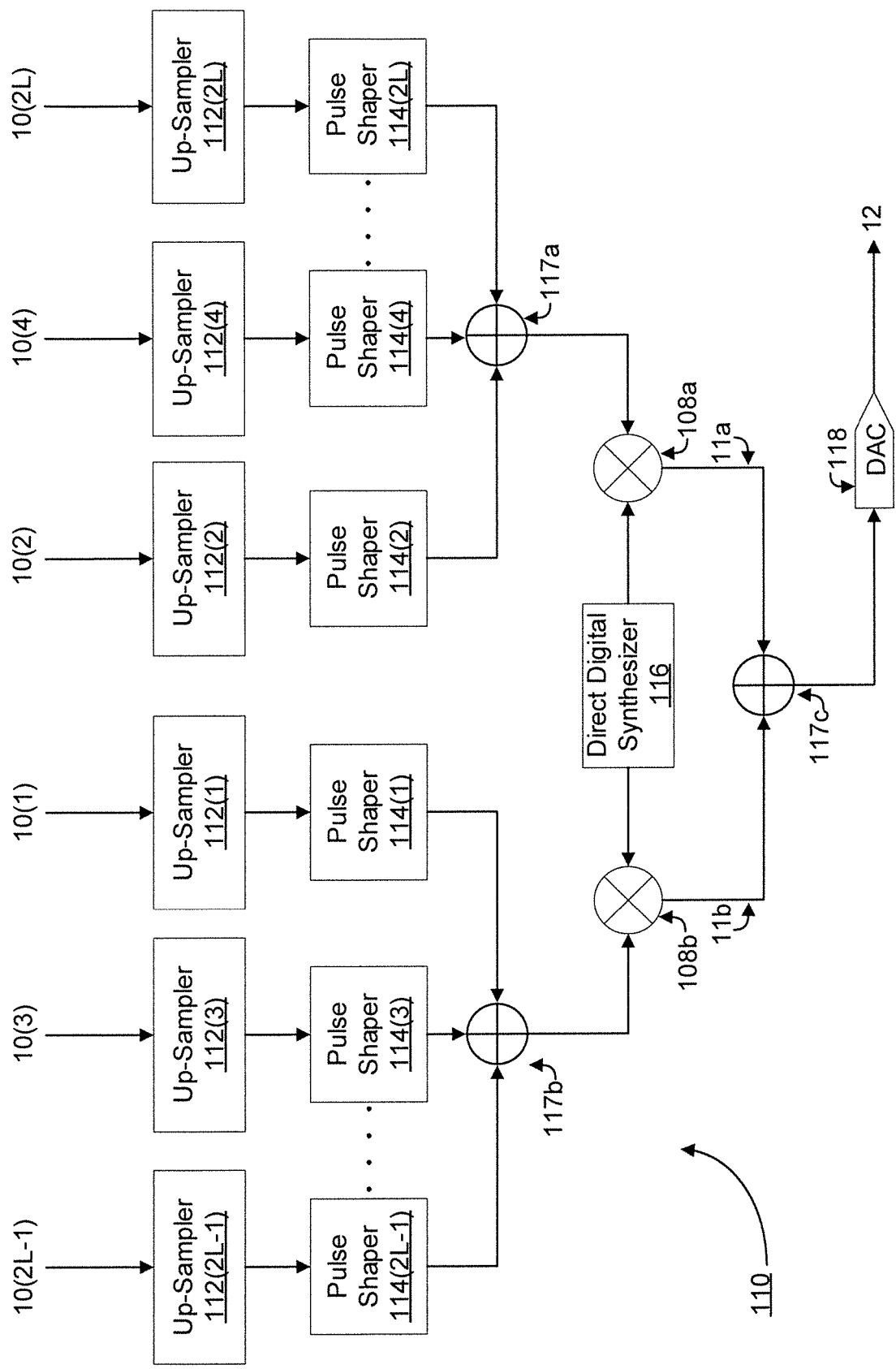
FIG. 7 is a block/flow diagram illustrating a system/method for a 2L-dimensional modulator for wireless communication with OAM-modes-enabled secure multidimensional coded modulation, in accordance with the present principles.

Referring now to FIG. 7, a 2L-dimensional modulator for wireless communication with OAM-modes-enabled secure multidimensional coded modulation is illustratively depicted in accordance with one embodiment of the present principles.

According to aspects of the present invention, the DOF employed for multidimensional multiplexing including OAM modes may include multiplexing across basis functions in a Multiple Input Multiple Output (MIMO) implementation. This implementation, according to aspects of the present invention, includes utilizing baseband basis functions to map data sequences 10(1), . . . , 10(2L) to a signal constellation rather than mapping in-phase and quadrature sequences, such as described above. Accordingly, transmit electronics, such as, e.g., a transmitter including a modulator 110 is contemplated.

The modulator 110 imposes the data sequences 10(1), . . . , 10(2L) on 2L Slepian sequences, serving as impulse responses of corresponding filters. Slepian sequences have the beneficial properties of being mutually orthogonal with a double orthogonality property, for example, Equation 9 below:

$$\Sigma_{m=0}^{L-1} s_m^{(l)}(L_g, W) s_m^{(k)}(L_g, W) = \mu_d(L_g, w) \Sigma_{m=-\infty}^{\infty} s_m^{(l)}(L_g, W) s_m^{(k)}(L_g, W) = \mu_d(L_g, W) \delta_{lk},$$ Equation 9:

where $L_g$ is the sequence length, W is the discrete bandwidth, $\delta_{dk}$ is the delta function, and $\mu_d$ represents the ordered eigenvalues.

Due to the double orthogonality property, the baseband basis functions that form the projections for the baseband domain sequences 10(1), ..., 10(2L) will stay orthogonal even outside of a desired symbol time-interval. This property serves to reduce sensitivity to intersymbol interference (ISI) and multipath fading. When used for baseband basis functions, the Slepian sequences may simply be software defined functions.

Additionally, the baseband basis functions may be complex basis functions derived from the Slepian sequences. Thus, each Slepian sequence of even order can be used to create a real component of a corresponding complex basis function, and each Slepian sequence of odd order can be used to create an imaginary component of a corresponding complex basis function. As described above, the real and imaginary components of the corresponding complex basis functions conform to the double orthogonality property. As a result, for L complex basis functions, there will be 2L basis functions corresponding to 2L Slepian sequences. The modulator 110 may impose the data sequences 10(1), ..., 10(2L), on baseband impulse responses of corresponding filters derived from 2L Slepian sequences. As a result, the data sequences 10(2), 10(4), ..., 10(2L) are imposed on impulse responses derived from even order Slepian sequences and form an in-phase channel, while on the other hand the data sequences 10(1), 10(3), ..., 10(2L−1) are imposed on the impulse responses (e.g., filters) derived from odd order Slepian sequences and form the quadrature channel.

While described above is the use of Slepian sequences for baseband functions, the modulator 110 of the present invention may use of Slepian sequences to generate passband filters with passband impulse responses derived from Slepian sequences and implemented by adjusting the gains and phase shifts of corresponding antenna array elements. When used in this way, 2K Slepian sequences may be used to derive 2K passband basis functions to form an Orthogonal Division Multiplexing DOF. Alternative, a combination of passband and baseband functions may be employed to increase the DOF to 2LK DOF.

Upon deriving the baseband domain sequences from Slepian sequences, they are used as impulse responses of filters, such as, e.g., pulse shapers 114(1), ..., 114(2L). The data sequences 10(1), ..., 10(2L) are used as inputs into the up-samplers 112. The up-sampled sequences 10(1), ..., 10(2L) are then passed to the DT pulse shapers 114, whose impulse responses are derived from Slepian sequences.

The outputs of DT pulse shapers of even order are combined at adder 117a to form the in-phase channel. Similarly, the outputs DT pulse shapers with odd order are combined at adder 117b form a quadrature channel. The resulting in-phase channel and quadrature channels are used as inputs of the direct digital synthesizer 116. The direct digital synthesizer 116 generates cosine and sine waveforms that are up-converted to the desired carrier frequency with the help of mixers (multipliers) 108a and 108b.

The in-phase and quadrature signals 11a and 11b may then be combined at adder 117c and converted to analog domain by a digital analog converter (DAC) 118 to create a RF passband signal 12. Accordingly, the resulting RF signal 12 is a 2L-dimensional signal. The RF modulated signal 12 may then be forwarded to an OAM antenna element or OAM antenna element array, as discussed above. It is also possible to use another continuous-time up-converter to move the carrier frequency to mm-wave or THz range. The OAM antenna element or OAM antenna element array may include one or more OAM antenna elements, with each OAM antenna element including an azimuthal phase shifter as described above, such as, e.g. SPP.

Figure 8:
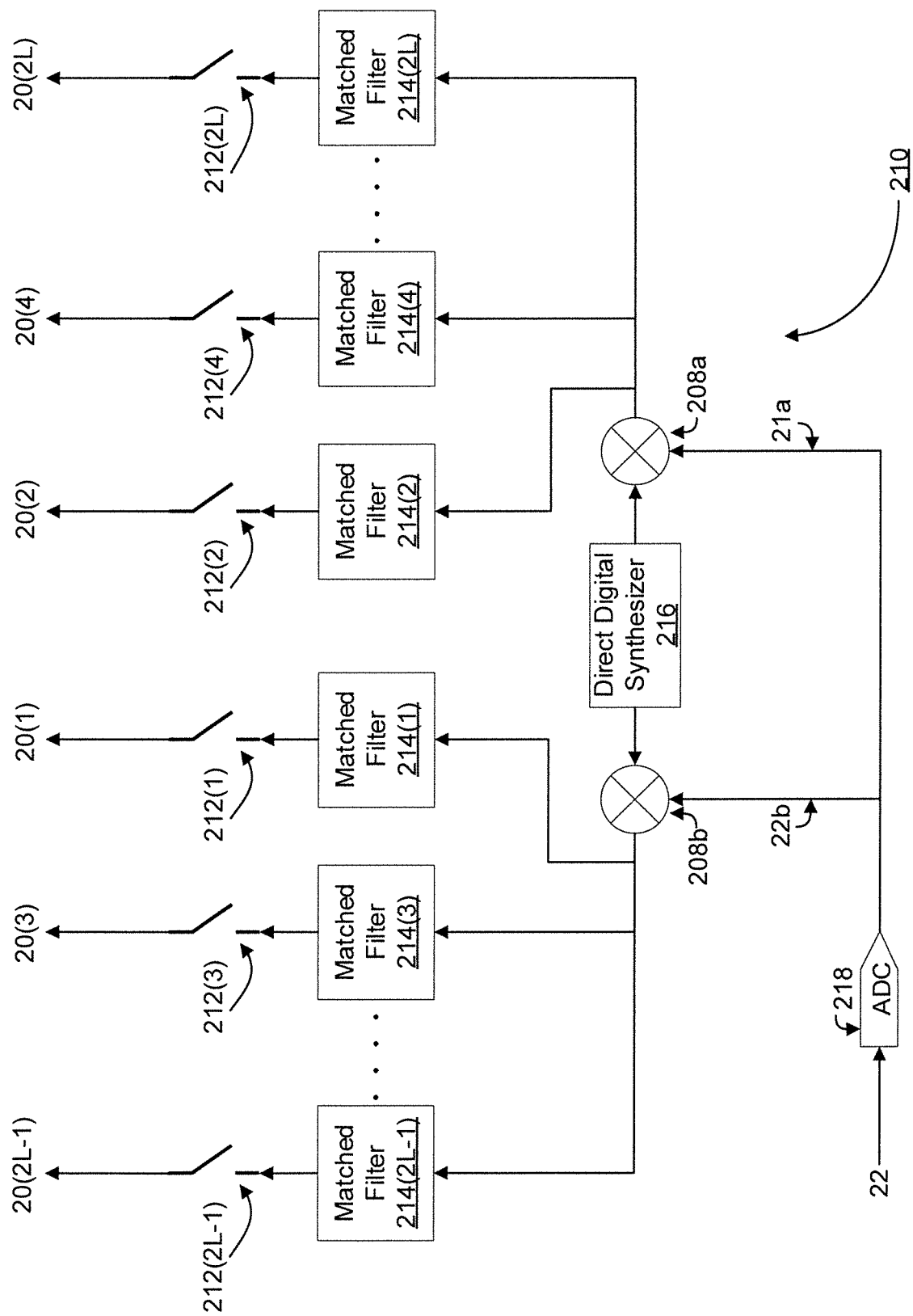
FIG. 8 is a block/flow diagram illustrating a system/method for a 2L-dimensional demodulator for wireless communication with OAM-modes-enabled secure multidimensional coded modulation, in accordance with the present principles.

Referring now to FIG. 8, a 2L-dimensional demodulator for wireless communication with OAM-modes-enabled secure multidimensional coded modulation is illustratively depicted in accordance with one embodiment of the present principles.

According to aspects of the present invention, the OAM multiplexed signal is processed by receive electronics, such as, e.g., an OAM demultiplexer 210. The n-th branch provides the projection along the n-th OAM mode, and this signal is passed to ADC input 22.

An ADC 218 may receive the 2L-dimensional RF signal 22 and convert it into digital form. As a result, digital signals 21a and 21b are generated, and passed to corresponding in-phase and quadrature down-converters (multipliers).

Each digital input 21a and 21b may be demodulated with a direct digital synthesizer 216. The direct digital synthesizer 216 generates the cosine and sine waveforms, used as DT local oscillators outputs to perform the down-conversion process at mixers 208a and 208b used as the quadrature down-converters (multipliers). Accordingly, the direct digital synthesizer 216 and down-converters 208a and 208b perform the conversion in baseband. As a result, the received 2L-dimensional RF signal 22 is down-converted into 2L-dimensional baseband signals.

The baseband in-phase and quadrature signals are passed to matched filters 214(1), ..., 214(2L). The matched filters 214(1), ..., 214(2L) may be configured to include impulse responses that match the DT pulse shaping filters 114(1), ..., 114(2L) of a 2L-dimensional modulator such as the modulator 110 described above. As a result, the matched filters 214(1), ..., 214(2L) provide the projections along the baseband basis functions.

The resulting baseband domain pulses from the demodulated in-phase and quadrature channels 21a and 21b, at the outputs of matched filters 212(1), ..., 212(2L), represent projections along baseband basis functions down-sampled by down-samplers 212(1), ..., 212(2L). The down-sampled values may therefore represent the samples of received constellation points provided in the received signal 22, the estimated constellation coordinates 20(2), 20(4), ..., 20(2L) are further passed to the multidimensional demapper.

Each sequence may then be demapped by a demapper. The demapper may be an a posteriori probability (APP) demapper. Accordingly, the baseband domain sequence samples 20(1), ..., 20(2L), representing the projections along the baseband basis functions, may be analyzed with 2L-dimensional a posteriori probability demapper by calculating symbol log-likelihood ratios (LLRs). The LLRs will provide the reliabilities of corresponding symbols. As a result, the demapper may calculate symbol LLRs passed to nonbinary LDPC decoder. When binary LDPC codes are used, the bit LLRs need to be calculated first from symbol LLRs. The LDPC decoder then performs iterative decoding, and generates the decoded sequence.

Figure 9:
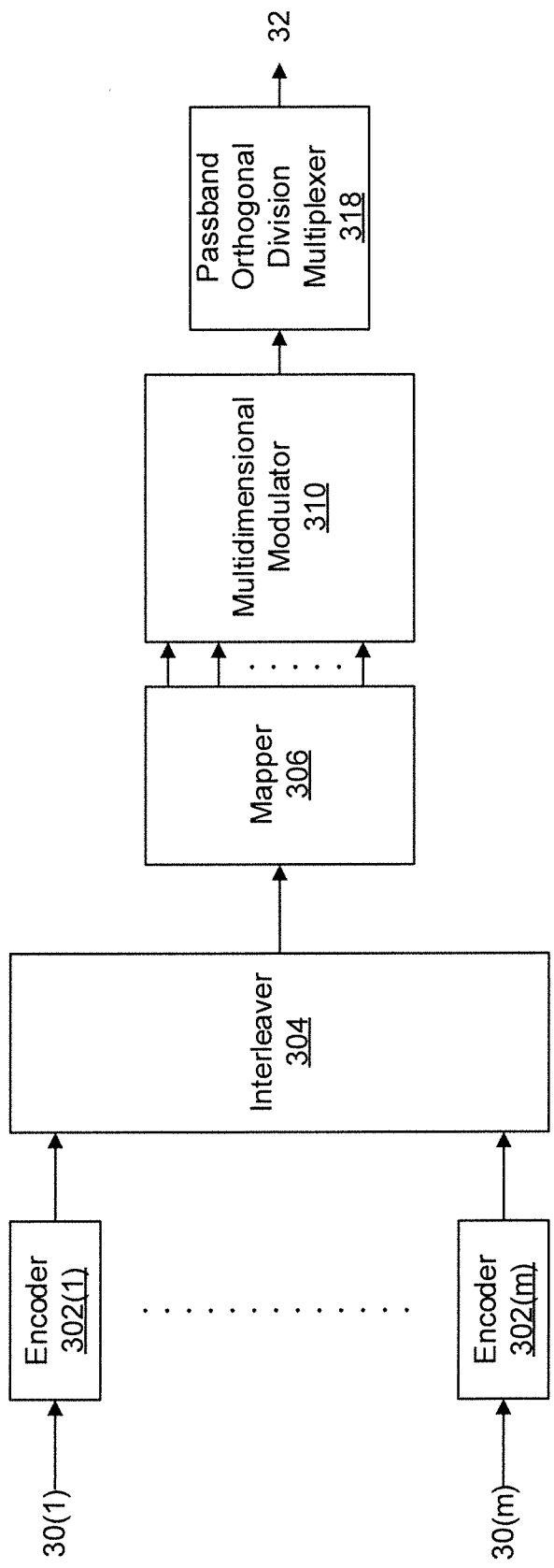
FIG. 9 is a block/flow diagram illustrating a system/method for a coded 2L-dimensional modulator for wireless communication with OAM-modes-enabled secure multidimensional coded modulation, in accordance with the present principles.

Referring now to FIG. 9, a coded 2L-dimensional modulator for wireless communication with OAM-modes-enabled secure multidimensional coded modulation is illustratively depicted in accordance with one embodiment of the present principles.

According to aspects of the present invention, a 2L-dimensional transmitter may include a multidimensional modulator, such as, e.g. a 2L-dimensional modulator described above, as well as additional signal processing and decoding components. The additional signal processing components assist to convert m independent data streams 30(1)-30(*m*) to a 2L-dimensional multiplexed signal 32 to be sent to an antenna array for transmission.

The independent data streams 30(1)-30(*m*) may be encoded by respective LDPC encoders 302(1)-302(*m*) into m independent encoded streams with corresponding codewords. The LDPC encoders 302(1)-302(*m*) may employ a software-defined LDPC coded modulation scheme for adaptive encoding. Using such a scheme, code rates may be adapted based on time-varying multipath channel conditions. Thus, the independent data streams 30(1)-30(*m*) may be encoded in way that is resistant to noise and spatial interference.

The independent encoded streams are then written into an interleaver 304. The interleaver 304 is configured to combine the independent encoded streams 30(1)-30(*m*) into a single data sequence for modulation.

The single data sequence at the output of interleaver 304 can then be mapped onto a signal constellation with a multidimensional mapper 306. Similar to above, the mapper 306 may be in the form of a LUT, however it may also be algorithmically determined. The LUT may map the data in the single data sequence to a constellation space that has a dimensionality corresponding to a modulator that will modulate the signal. According to aspects of the present invention, the constellation space may therefore be, similar to above, a 2L-dimensional space corresponding to 2L baseband functions.

The mapped data sequence may be then by modulated according to 2L baseband function by a 2L-dimensional modulator 310. The baseband functions, representing the impulse responses of a set of filters, such as e.g., pulse shapers in 2L-dimensional modulator, as described above, may be L complex baseband functions derived from Slepian sequences to produce a real set of L baseband functions corresponding to an in-phase channel, and an imaginary set of L baseband functions corresponding to a quadrature channel. However, other modulation methods are contemplated. Similar to what is described in the 2L-dimensional modulator described above, the 2L-dimensional modulator 310 may be based on direct digital synthesizer to combine the in-phase and quadrature channels and perform up-conversion.

The RF carrier, prior to being transmitted by an antenna array, may then be further up-converted by an RF up-converter to mm-wave or THz domain. The RF-upconverter may also perform frequency division multiplexing. Alternatively, the coded 2L-dimensional RF signal can be further multiplexed in passband orthogonal division multiplexer 318, composed of 2K passband filters implemented by properly adjusting the gains and phases of elements of an antenna array, such as an OAM antenna array. According to aspects of the present invention, the passband filters' impulse responses are derived from Slepian sequences as well. The RF orthogonal division multiplexing results in an RF multiplexed sequence 32 across, e.g., a 4LK multidimensional signal, such as an OAM-mode carrier signal corresponding to the 2L baseband basis functions and 2K passband basis functions. The RF multiplexed signal 32 may be directed towards single or multiple wireless receivers. Alternatively, the RF multiplexed signal 32 may be used as an input to transmit OAM antenna.

Figure 10:
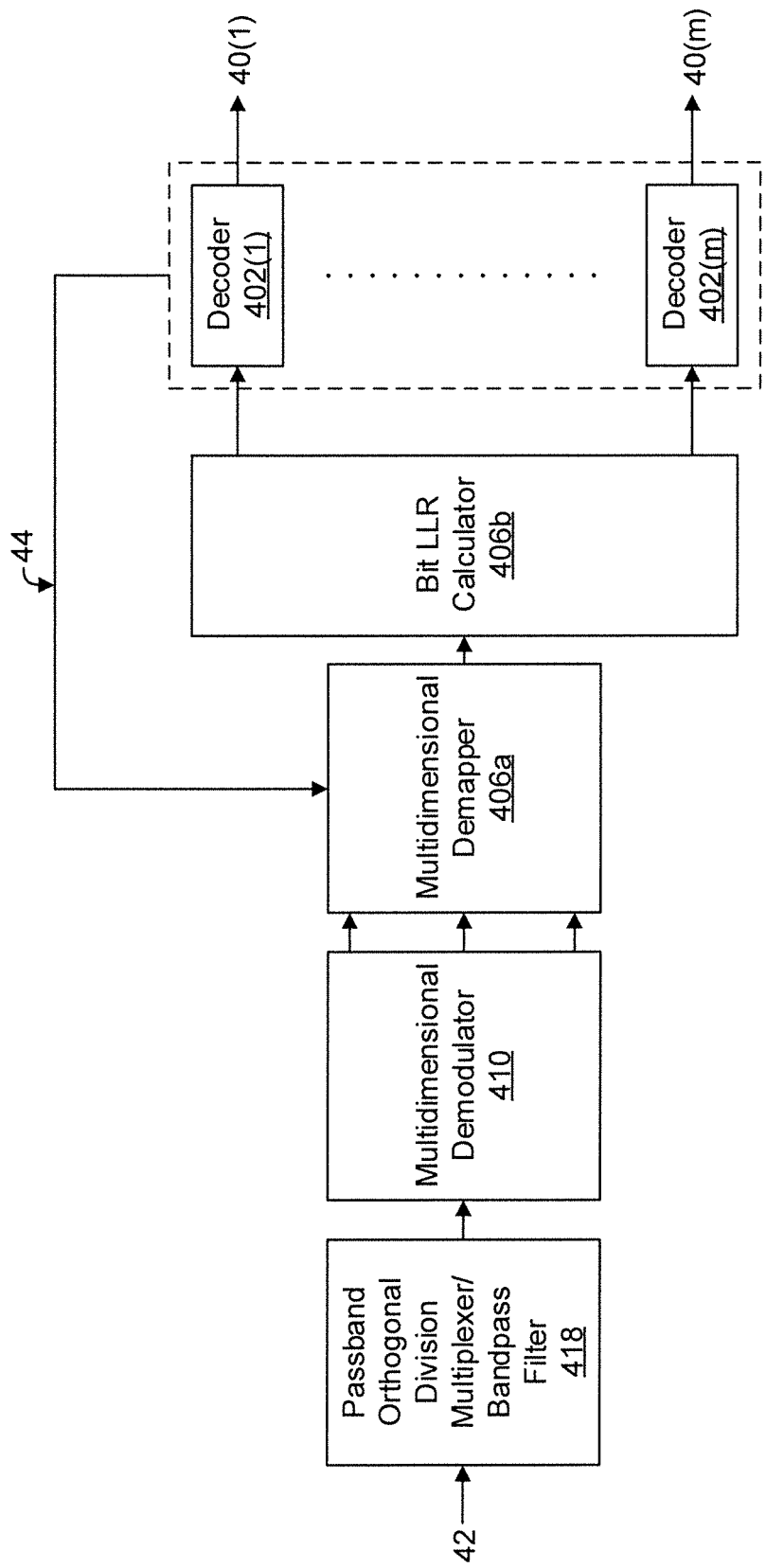
FIG. 10 is a block/flow diagram illustrating a system/method for an 2L-dimensional iterative demapper and decoder for wireless communication with OAM-modes-enabled secure multidimensional coded modulation, in accordance with the present principles.

Referring now to FIG. 10, a 2L-dimensional iterative demapper for wireless communication with OAM-modes-enabled secure multidimensional coded modulation is illustratively depicted in accordance with one embodiment of the present principles.

According to aspects of the present invention, a receiver may include a 2KL-dimensional demodulator, such as, e.g., a demodulator as described above, as well as additional signal processing and decoding components. The additional signal processing components assist demultiplexing of an RF multiplexed sequence 42 carrying, e.g. a 4LK-dimensional RF multiplexed sequence, such as discussed above, to projections along corresponding basis functions.

Having received an OAM mode carrier by an OAM antenna array, such as one discussed above, the carrier may be converted by the antenna array into projections along OAM basis functions to determine the transmitted RF multiplexed sequence 42, thus demultiplexing the OAM mode carrier. A bandpass filter 418 may then demultiplex the RF multiplexed sequence 42. The bandpass filter 418 may perform this demultiplexing by using inverse passband basis functions corresponding to, e.g., the 2K passband basis functions derived from complex Slepian sequences. Alternatively, the bandpass filter 418 may be configured to select a frequency band corresponding to the frequency bands when signals were RF multiplexed with FDM. As a result, the RF multiplexed sequence 42 may be demultiplexed across frequency bands by the bandpass filter 418.

The demultiplexing the 2K passband basis functions results in a 2L-dimensional sequence that is then demodulated by a multidimensional demodulator 410, including, e.g., a 2L-dimensional RF demodulator such as one described above. The multidimensional demodulator 410 is configured to determine projections along baseband DT basis functions, for example, e.g. along baseband functions derived from Slepian sequences as described above.

A multidimensional demapper 406*a* may then demap the projections based on APP, e.g., similar to the demapping described above. The demapper 406*a* may operate in a 2L-dimension signal space corresponding to a transmitter with a 2L-dimension modulator, such as one described above. Accordingly, the demapper 406*a* may demap the projections into symbol LLRs. The symbol LLRs will provide a most likely estimate of a transmitted symbol constellation points. When nonbinary LDPC coding is used the multidimensional demapper 406*a* will provide symbol LLRs to nonbinary LDPC decoder. On the other hand, when binary LDPC coding is used, the multidimensional demapper will provide symbol LLRs to bit LLR calculator 406*b*.

As a result, a bit LLR calculator 406*b* uses the symbol LLRs to calculate the most likely bits corresponding to the determined symbol constellation points, for uncoded signals. For coded signals, the bit LLRs are calculated with the help of bit LLR calculator 406*b*. The bit LLRs, representing the soft bit reliabilities, are then passed to the LDPC decoders 402. The decoded bit LLRs determine estimated original data sequences 40(1)-40(*m*) corresponding to the originally multiplexed independent data streams.

The demapper 406*a* may be subject to a bit error rate (BER) due to errors in the signal from transmission and/or processing. As a result, it is advantageous to reduce the BER. According to aspects of the invention, extrinsic information 44 from the LDPC decoders 402 may be passed back to the demapper 406*a* to iterate on the extrinsic information 44. This iteratively derived extrinsic information 44 may be employed by the demapper 406a to reduce the BER of demapping, thus improving the APP calculation and determination of symbol LLRs. As a result, better estimated original data streams 40(1)-40(m) may be determined.

Figure 11:
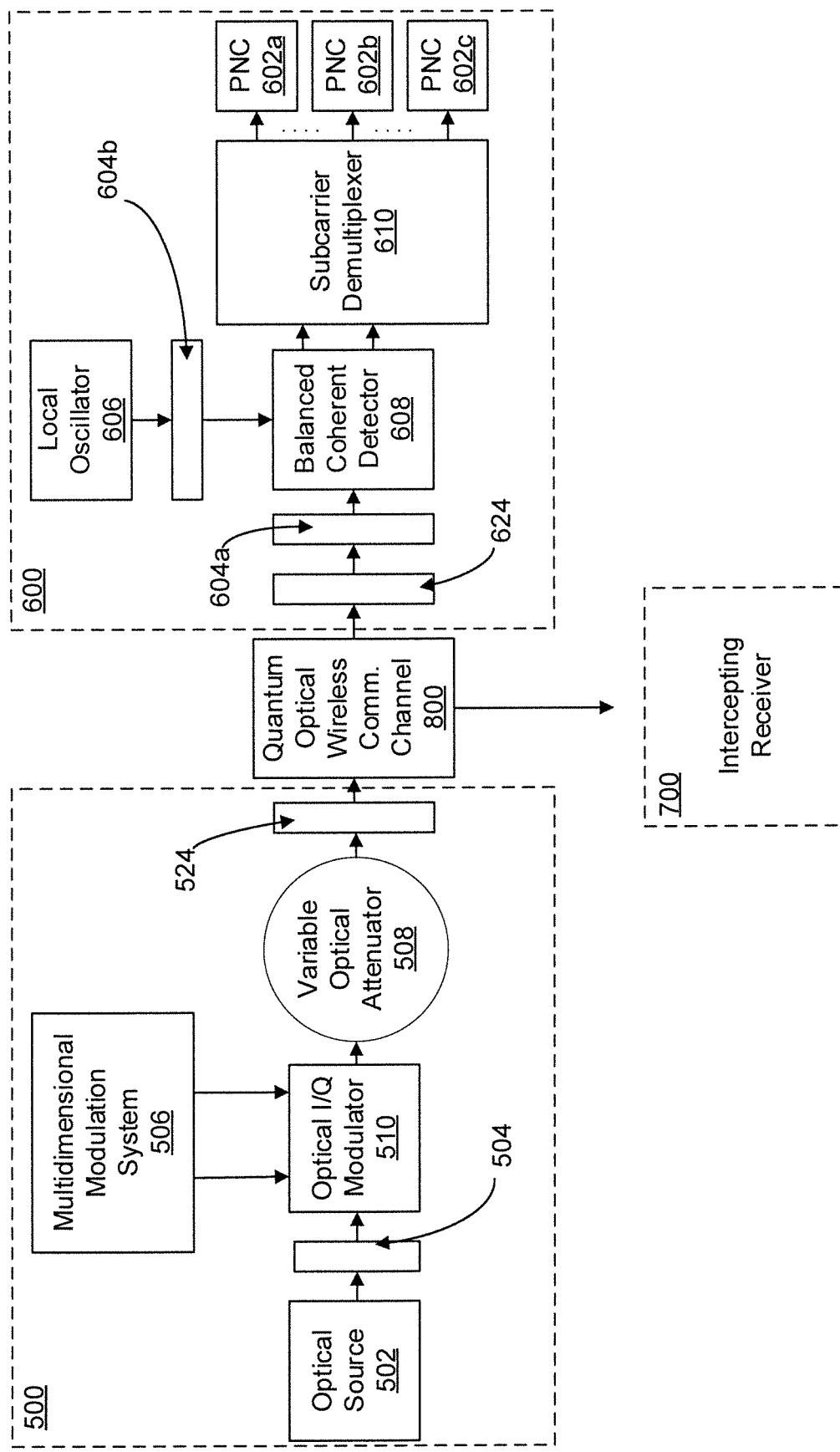
FIG. 11 is a block/flow diagram illustrating a system/method for unconditional physical layer security with optical wireless communication with OAM-modes-enabled secure multidimensional coded modulation, in accordance with the present principles.

Referring now to FIG. 11, an unconditional physical layer security scheme for optical wireless communication with OAM-modes-enabled secure multidimensional coded modulation is illustratively depicted in accordance with one embodiment of the present principles.

According to aspects of the present invention, physical-layer security may be enhanced by employing multiplexing across OAM modes. The OAM modes may be used to increase the dimensionality of the signal and the signal constellation space, thus increasing secrecy capacity and secure key rates. Accordingly, a signal may be transmitted from a transmitter 500 to an intended receiver 600 in an unconditionally secure transmission, such that the signal is secure from any intercepting receiver 700.

The transmitter 500 may include multidimensional modulation scheme 506. The multidimensional modulation scheme 506 may include, e.g., an arbitrary waveform generator, one or more multidimensional modulators combined with one or more a multidimensional multiplexer, or any suitable scheme for performing subcarrier multiplexing. The multidimensional modulation scheme 506 may be employed to perform subcarrier multiplexing (SCM) of a signal including multiple independent data streams. Thus, the multidimensional modulation scheme 506 may include, e.g., an arbitrary waveform generator, one or more multidimensional modulators (such as an RF modulator or other modulator) combined with one or more multidimensional multiplexers, or any suitable scheme for performing subcarrier multiplexing. The data streams may include, e.g., data, a cryptographic key, or both.

According to aspects of the present invention, the multidimensional modulation scheme 506 may be a modulator such as, e.g., an RF modulator as described above for generating an in-phase channel and quadrature channel for the independent data streams. The SCM may therefore include phase-shift keying (PSK) to RF modulate a subcarrier in an in-phase channel, or the SCM may include quadrature amplitude modulation (QAM) to RF modulate the subcarrier across both in-phase and quadrature channels. As described above, each of the subcarrier channels may additionally include multidimensional modulation by employing Slepian-sequence derived baseband basis functions. Thus, as described above, the dimensionality of the signal space may be increased to a determined amount.

The transmitter 500 may include an optical I/Q modulator 510 to further modulate the multidimensional in-phase and quadrature channels generated by the multidimensional modulation scheme 506, and convert them to optical domain. To accomplish this, an optical source 502, such as, e.g., a transmit laser diode or an ASE noise source, may provide an optical signal to the optical I/Q modulator 510. The optical I/Q modulator 510 may therefore further modulate the modulated subcarrier from the multidimensional modulation scheme 506 into the optical signal from the optical source 502 to generate an optically modulated multidimensional signal/supercarrier.

The optically modulated multidimensional signal/supercarrier may be used as an input to an optical OAM multiplexer 524. The optical OAM multiplexer 524 may include an azimuthal phase shifter, such as, e.g., an SPP, computer generated hologram, or grating. This optical OAM multiplexer 524 may be included with the optical I/Q modulator 510, and may be similar to OAM multiplexers including a SPP as described above, except designed for optical frequencies. Thus, the optically modulated multidimensional signal/supercarrier may be imposed on an OAM mode to form an OAM carrier.

In addition to OAM multiplexing, the polarization division multiplexing (PDM) can also be used. The polarization controller 504 is used to ensure that photons are properly polarized.

A variable optical attenuator 508 is then used to reduce the signal level down to the shot noise level.

As a result, the transmitter 500 generates a signal constellation space that combines optical and wireless features to generate a highly multidimensional signal. This highly multidimensional constellation space ensures that an intercepting receiver 700 that intercepts a given DOF will only receive a single constellation point amongst the many independent data streams multiplexed in the constellation. As a result, the intercepting receiver 700 will be unable to receive a large portion of the signal, and therefore will be unable to reproduce the transmitted data. In the case that a raw key is sent in the signal, the intercepting receiver 700 will be unable to fully intercept the raw key transmission, and thus be unable to compromise the security of a message. Moreover, even if OAM modes are coupled, security will still not be compromised because multiple DOF are implemented.

The quantum channel 800 may be any communication medium suitable for carrying quantum information, such as orbital angular momentum, including, e.g., optical fiber, and optical wireless communication link.

Additionally, an intended receiver 600 is configured to receive the secure transmission and extract the data from the supercarrier. The intended receiver 600 may use classical coherent optical detection with phase noise cancellation (PNC) to control excess noise and thus receive a message or shared key from the transmitter 500 with low bit-error rate.

For example, the intended receiver 600 includes an optical OAM demultiplexer 624. The optical OAM multiplexer 624 may include a complex-conjugate (c.c.) azimuthal phase shifter, such as, e.g., a SPP, computer generated hologram, or grating. This optical OAM demultiplexer 624 may be similar to OAM demultiplexers including a SPP as described above, except designed for optical frequencies. Thus, the optical OAM demultiplexer extracts projections from the transmitted OAM carrier.

The receiver 600 will additionally include a balanced coherent detector 608. The projections may be passed through a polarization controller 604a similar to the polarization controller 504 discussed above. The polarization controllers 604 and 604a are used to ensure that polarization states of received signal and local oscillator signal are matched. Alternatively, the polarization beam splitters may be employed to participate in polarization division demultiplexing.

The balanced coherent optical detector 608 is configured to receive the projections and extract the PSK, QAM, or multidimensional baseband signals from the supercarrier, for example, e.g., similar to demodulators described above. Balanced detector 608 mixes the received optical signal and local laser signals to provide the corresponding projections along in-phase and quadrature basis functions.

A subcarrier demultiplexer 610 may include components for demultiplexing the subcarrier RF channels on different RF subcarrier frequencies, to generate multiple multidimensional signals passed to PNC devices.

There may be as many PNC devices as there are independent data streams input into the transmitter 500. The PNC devices 602a, 602b and 602c are configured to cancel the effects of laser phase noise and any random phase shift introduced by the quantum channel 800. According to aspects of the present invention, each PNC device 602a, 602b and 603c includes two square operators, one addition operator, a digital DC cancellation block and a low pass filtering block. Squaring in-phase and quadrature channels of the optical carrier cancels the effects of laser phase noise and any random phase shifts introduced by the quantum channel, thus reducing bit-rate error. Accordingly, the original independent data streams may be estimated with low bit-rate error in a highly secure fashion. After PNC each multidimensional signal further undergoes the multidimensional demodulation process described above.

After that, the reverse information reconciliation and privacy amplification are further used to remove any correlation with respect to an eavesdropping receiver 700.

The secure key rates (SKRs) may also be very high because SKR is proportional to the number of DOF. Thus, the proposed RF-subcarrier assisted CV-QKD can be orders of magnitude greater than other quantum key distribution schemes.

Another approach to enable unconditional security over RF links is by employing the microwave illumination approach, in which we can entangle mm-wave/THz/RF wave and optical beam, so that through flood-light (FL)-QKD approach we can achieve multi-Gb/s secure key rates over mm-wave/THz/RF links. In this scenario, the weak optical beam is used to monitor Eve's intrusion, while mm-wave/THz/RF link is used for raw-key transmission.

Figure 12:
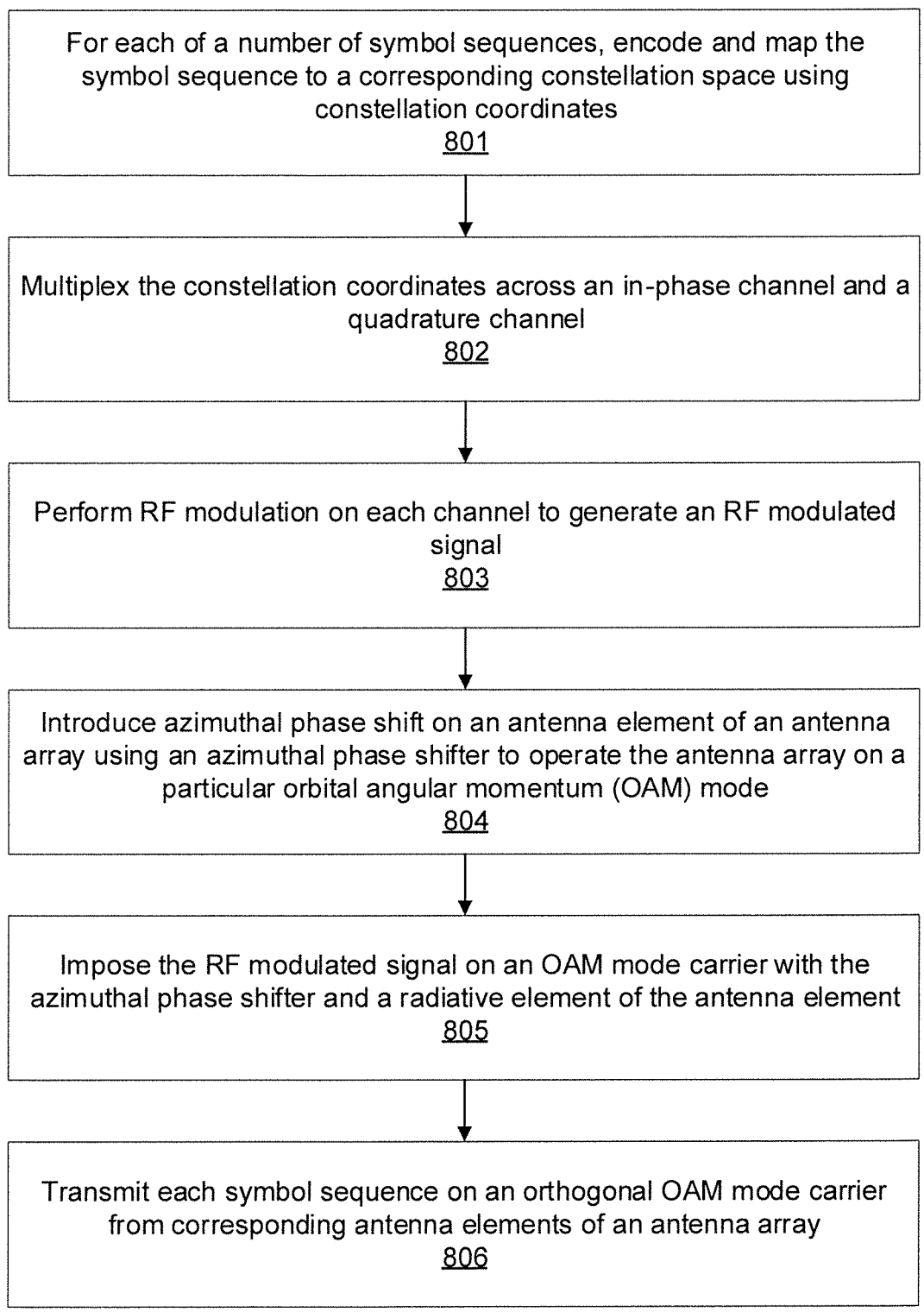
FIG. 12 is a block/flow diagram illustrating a system/method for wireless transmission with OAM-modes-enabled secure multidimensional coded modulation, in accordance with the present principles.

Referring now to FIG. 12, a system/method for wireless transmission with OAM-modes-enabled secure multidimensional coded modulation is illustratively depicted in terms of flow-chart in accordance with one embodiment of the present principles.

According to aspects of the present invention, several sequences of symbols may be multiplexed together using OAM modes for secure multidimensional coded modulation. According to aspects of the present invention, each of the symbol sequences will be encoded and mapped to a corresponding constellation space using constellation coordinates at block 801. The encoding may include, e.g., performing LDPC encoding for each symbol sequence, and mapping may be performed with, e.g., a look-up-table.

At block 802, the constellation coordinates will be multiplexed across an in-phase channel and a quadrature channel. The multiplexing may include mapping to each of the in-phase channel and the quadrature channel using quadrature amplitude multiplexing. Alternatively, the phase-shift keying (PSK) employing only in-phase channel maybe used or quadrature amplitude modulation (QAM) by employing both in-phase and quadrature channels. The multiplexing may further include up-sampling each channel based on the sampling period and symbol duration, and pulse shaping each channel using an appropriate impulse response.

At block 803, RF modulation will be performed on each channel to generate an RF modulated signal. RF modulation may include imposing RF carriers on each channel using, e.g., a direct digital synthesizer and mixers. Once each channel is carried by a respective RF carrier, the channels may be recombined and converted to analog domain with, e.g., a digital to analog converter.

At block 804, an antenna element of an OAM antenna element array may be azimuthal phase shifted to generate a particular orbital angular momentum (OAM) mode. Azimuthal phase shifting of the OAM antenna element may include imposing the signal on OAM basis function ($e^{jm\phi}$).

At block 805, the RF modulated signal will be imposed on the OAM mode by passing the modulated signal from azimuthal phase shifter to the radiative antenna element. Encryption may be performed by, e.g., including multiple OAM modes corresponding to multiple OAM antenna element, where the RF modulated signal is imposed on a random one of the multiple OAM modes.

At block 806, each symbol sequence may be imposed on an orthogonal OAM mode carrier by transmitting each symbol sequence from a corresponding OAM antenna element of the OAM antenna element array. Accordingly, each OAM antenna element will introduce a distinct azimuthal phase shift according to the desired OAM mode. As a result, the transmitted signal from each OAM antenna element will be carried by an OAM mode that is orthogonal to any other OAM mode, and thus is independent from any other OAM mode carrier. Multiple signals will be imposed on different OAM modes and combined together. Masking may be performed for the transmitted orthogonal OAM mode carriers by including noisy OAM mode carriers for OAM modes having a negative index in the azimuthal phase term, to hide any data structure in both time- and frequency-domains for an unauthorized user.

Figure 13:
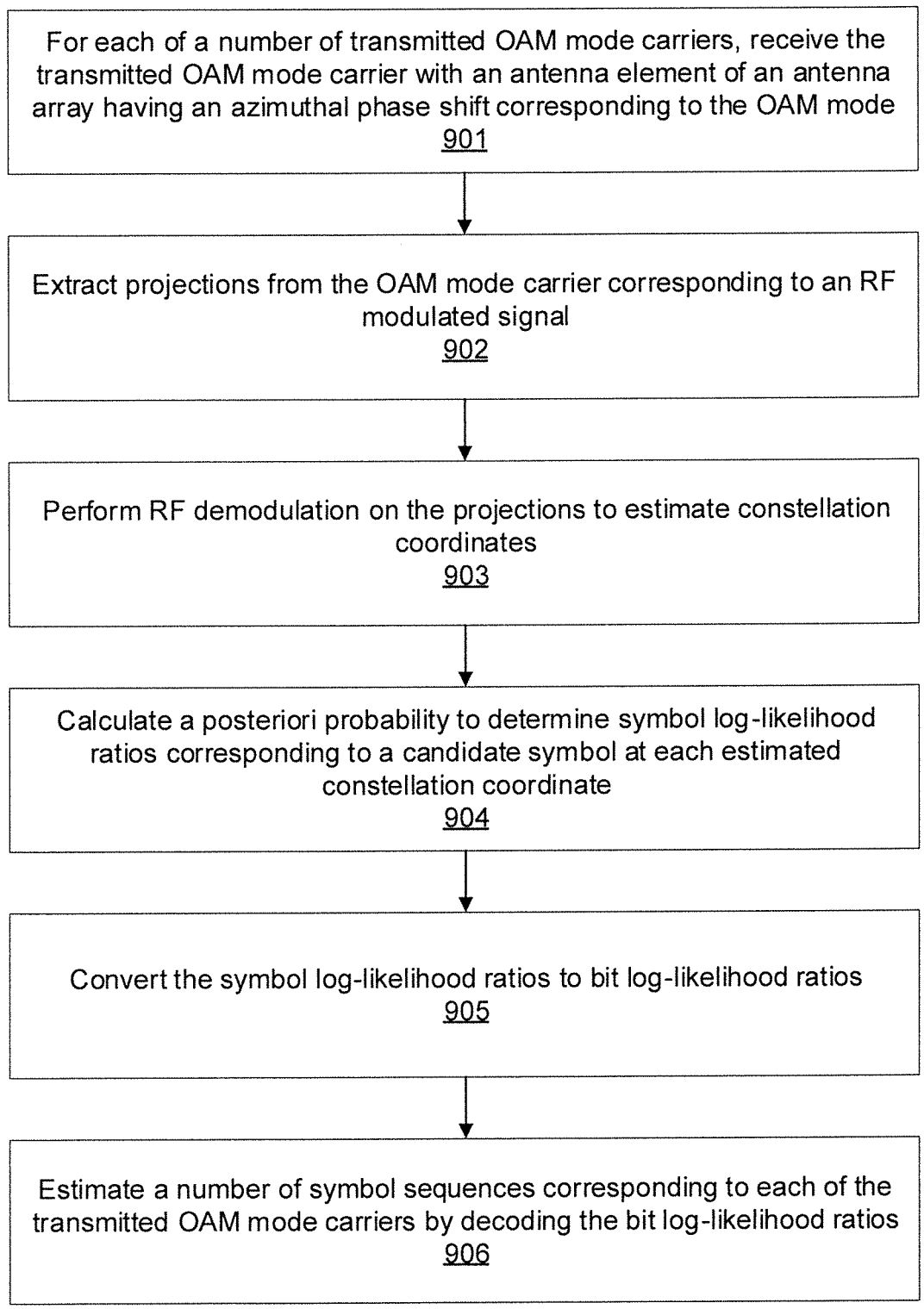
FIG. 13 is a block/flow diagram illustrating a system/method for receiving a wireless signal with OAM-modes-enabled secure multidimensional coded modulation is illustratively depicted in accordance with one embodiment of the present principles.

Referring now to FIG. 13, a system/method for receiving a wireless transmission with OAM-modes-enabled secure multidimensional coded modulation is illustratively depicted in flow-chart fashion in accordance with one embodiment of the present principles.

According to aspects of the present invention, a set of OAM mode carrier signals may be received by an OAM antenna element array, and symbol sequences corresponding to the OAM mode carrier signals may be estimated therefrom. For each of the transmitted OAM mode carriers, a respective OAM antenna element of the OAM antenna element array will receive the OAM mode carrier signal by having a complex-conjugate azimuthal phase shift that corresponding to the received OAM mode carrier at block 901. Thus, the receive antenna element may have an azimuthal phase shift with an index that is a complex conjugate to the azimuthal phase shift term governing the far field transmission of the OAM mode carrier signal. To perform decryption on an OAM carrier signal that has been encrypted as described above, multiple OAM antenna elements may be employed to receive signals where only one of the multiple OAM antenna elements has the correct complex conjugate azimuthal phase term. A selection device may therefore be employed to select the signal from the OAM antenna element having the largest current amplitude corresponding to a received signal. Alternatively, an adaptive, reconfigurable, SPP can be used to get the desired projection.

At block 902, projections are then extracted from the OAM mode carrier signal corresponding to an RF modulated signal. These projections are in fact the discrete-time projections along basis function that correspond to the RF modulated signal.

At block 903, RF demodulation is performed on the projections to estimate constellation coordinates. RF demodulation may be performed by a demodulator including, e.g., a directed digital synthesizer, combined with mixers, to extract in-phase and quadrature channels from the projections, matched filters that are configured to provide the projections along the baseband basis functions, derived from Slepian sequences.

At block 904, a posteriori probability is calculated to determine symbol log-likelihood ratios corresponding to each candidate symbol. The symbol LLRs have been calculated in APP demapper.

At block 905, the symbol log-likelihood ratios are converted to bit log-likelihood ratios.

At block 906, the decoding is performed by, e.g., LDPC decoders. Accordingly, a set of OAM mode carriers may be received by an OAM antenna element array and the carried symbol sequence for each OAM mode carrier may be estimated at a receiver to obtain the original sequences.

Figure 14:
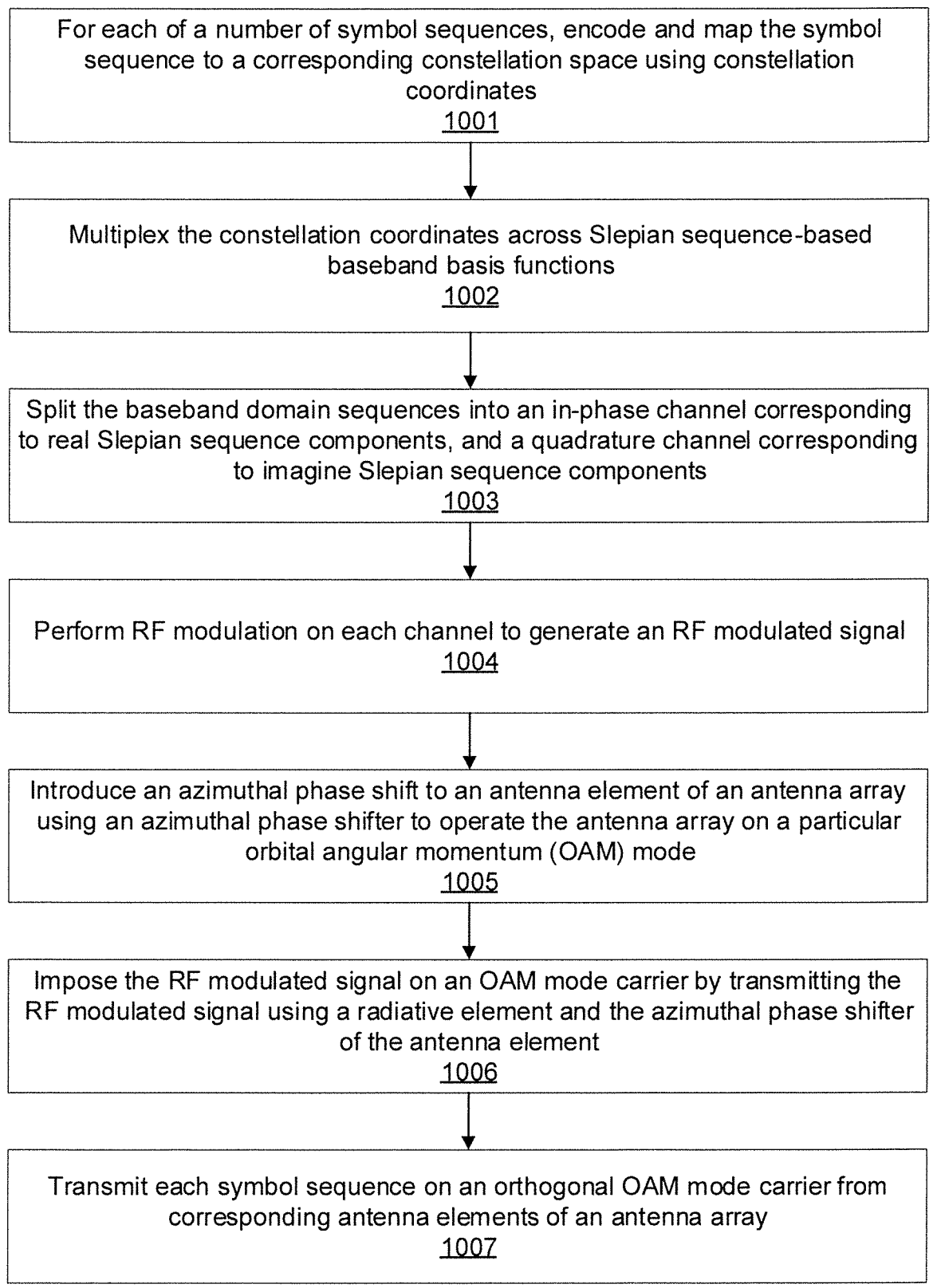
FIG. 14 is a block/flow diagram illustrating a system/method for wireless transmission with multidimensional coded modulation using baseband functions, in accordance with the present principles.

Referring now to FIG. 14, a system/method for wireless transmission with multidimensional coded modulation using baseband functions is illustratively depicted in accordance with one embodiment of the present principles.

According to aspects of the present invention, a set of symbols may be multiplexed using OAM modes for secure multidimensional coded modulation. The set of symbols may include a number of symbol sequences. According to aspects of the present invention, each of the symbol sequences will be encoded and mapped to a corresponding constellation diagram using constellation coordinates at block 1001. The encoding may include, e.g., performing LDPC encoding for each symbol sequence, and mapping may be performed with, e.g., a look-up-table.

At block 1002, the constellation coordinates will be multiplexed across multiple mutually orthogonal baseband basis functions. This implementation, according to aspects of the present invention, includes utilizing baseband basis functions derived from Slepian sequences to map baseband domain sequences to a signal constellation rather than mapping to in-phase and quadrature coordinates, such as described above.

At block 1003, the baseband domain sequences are split into an in-phase channel corresponding to even order Slepian sequence components, and a quadrature channel corresponding to odd order Slepian sequence components. Because Slepian sequences are real, 2L Slepian sequences are used to create L complex basis functions. The baseband domain sequences derived from the Slepian sequences are used as impulse responses of corresponding filters, including pulse shapers in 2L-dimensional modulator described above.

While described above is the use of Slepian sequences for baseband functions, the present invention also contemplates the use of Slepian sequences to generate passband filters by deriving impulse responses by properly adjusting the gains and phase shifts of antenna array elements. When used in this way, 2K passband basis functions are used to enable the Orthogonal Division Multiplexing DOF.

At block 1004, RF modulation will be performed on each channel to generate an RF modulated signal. RF modulation may include imposing RF carriers on each channel using, e.g., a direct digital synthesizer and mixers. Once each channel is carried by a respective RF carrier, the channels may be combined and converted to analog domain with, e.g., a digital to analog converter.

At block 1005, an OAM antenna element is used to impose the azimuthal basis function ($e^{jm\Phi}$) and transmit such a signal towards the remote destination.

At block 1006, the RF modulated signal will be imposed on the OAM mode of the OAM antenna element by transmitting the RF modulated signal from an azimuthal phase shifted radiative element. Encryption may be performed by, e.g., including multiple OAM modes corresponding to multiple OAM antenna elements, where the RF modulated signal is imposed on a random one out of the multiple OAM modes available. Randomly imposing the RF modulated signal on the one of the multiple OAM modes may be performed using a random switch between the RF modulator and the multiple OAM antenna elements.

At block 1007, each symbol sequence may be imposed on an orthogonal OAM mode carrier by transmitting each symbol sequence from a corresponding OAM antenna element of the OAM antenna element array. Accordingly, each OAM antenna element may have a distinct azimuthal phase shift of its azimuthal phase term to form a distinct OAM mode with each OAM antenna element. As a result, the transmitted signal from each OAM antenna element will be carried by an OAM mode that is orthogonal to any other OAM mode, and thus it is independent from other OAM mode carriers. Masking may be performed for the transmitted orthogonal OAM mode carriers by including noisy OAM mode carriers for OAM modes having a negative index in the azimuthal phase term to hide the data structure to an unauthorized user.

Figure 15:
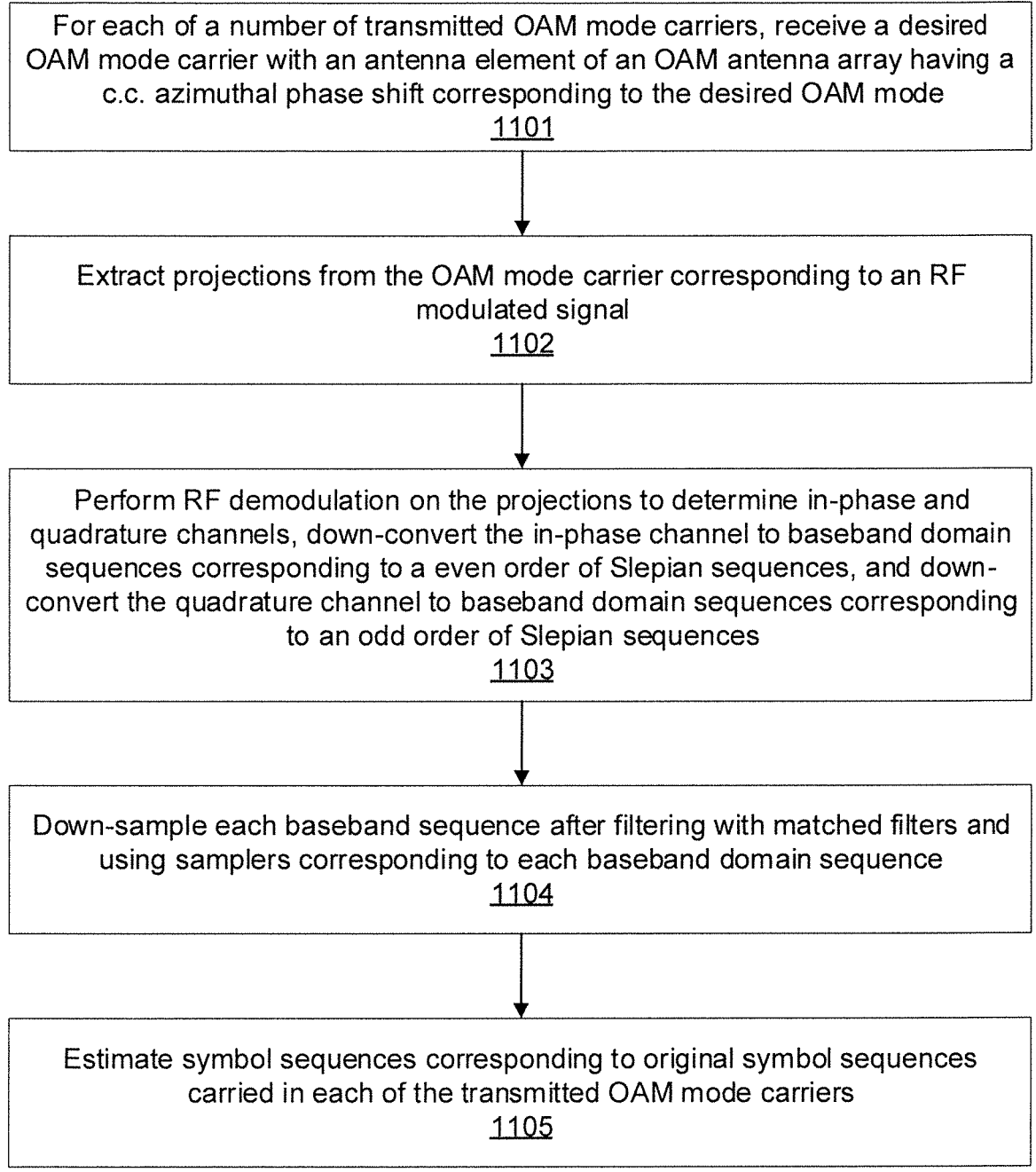
FIG. 15 is a block/flow diagram illustrating a system/method for receiving a wireless signals for multidimensional coded modulation using baseband functions, in accordance with one embodiment of the present principles.

Referring now to FIG. 15, a system/method for receiving a wireless transmission with multidimensional coded modulation using baseband functions is illustratively depicted with help of flow-chart in accordance with one embodiment of the present principles.

According to aspects of the present invention, a set of OAM mode carrier signals may be received by an OAM antenna element array, and symbol sequences corresponding to the OAM mode carrier signals may be estimated therefrom. For each of the transmitted OAM mode carriers, a respective receive antenna element of the OAM antenna element array will receive the OAM mode carrier signal by having an azimuthal phase shift that corresponds to the received OAM mode carrier at block 1101. Thus, the receive antenna element may have an azimuthal phase shift with an index that is a complex conjugate to the azimuthal phase shift term governing the far field transmission of the OAM mode carrier signal. To perform decryption on an OAM carrier signal that has been encrypted as described above, multiple OAM antenna elements may be employed to receive signals where only one of the multiple OAM antenna elements has the correct azimuthal phase term. A selection device may therefore be employed to select the signal from the OAM antenna element having the largest current amplitude corresponding to a received signal. Alternatively, the adaptive, reconfigurable, SPP maybe be used to detect the desired OAM mode.

At block 1102, projections are then extracted from the OAM modes carrier signal with each projection corresponding to a 2L-dimensional RF modulated signal.

At block 1103, RF demodulation is performed on the projections to determine in-phase and quadrature channels, down-convert the in-phase channel to baseband domain sequences corresponding to even order Slepian sequences, and down-convert the quadrature channel to baseband domain sequences corresponding to odd order Slepian sequences. RF demodulation may be performed by a demodulator including, e.g., a directed digital synthesizer and mixers to extract in-phase and quadrature channels from the projections.

At block 1104, re-sample each baseband sequence after passing through matched filters and down-sample each match filter output corresponding to each baseband domain sequence. The matched filters may be configured to have impulse responses that match the DT pulse shaping filters of a 2L-dimensional modulator such as the modulator described above. As a result, the matched filters determine pulses corresponding to each of the signals that match baseband domain basis functions, to output baseband domain pulses.

The resulting baseband domain pulses from the demodulated in-phase and quadrature channels may then be down-sampled by corresponding samplers, after proper match filtering, respectively. The down-sampled signals may therefore represent estimates of constellation points provided in the received signal.

At block 1105, symbol sequences corresponding to original symbol sequences carried in each of the transmitted OAM mode carriers are estimated. Estimating the symbol sequences may include, e.g., calculating a posteriori probability to determine symbol log-likelihood ratios corresponding to each candidate symbol, converting the symbol log-likelihood ratios to bit log-likelihood ratios, and decoding the bit log-likelihood ratios to obtain estimates of the original sequences.

Figure 16:
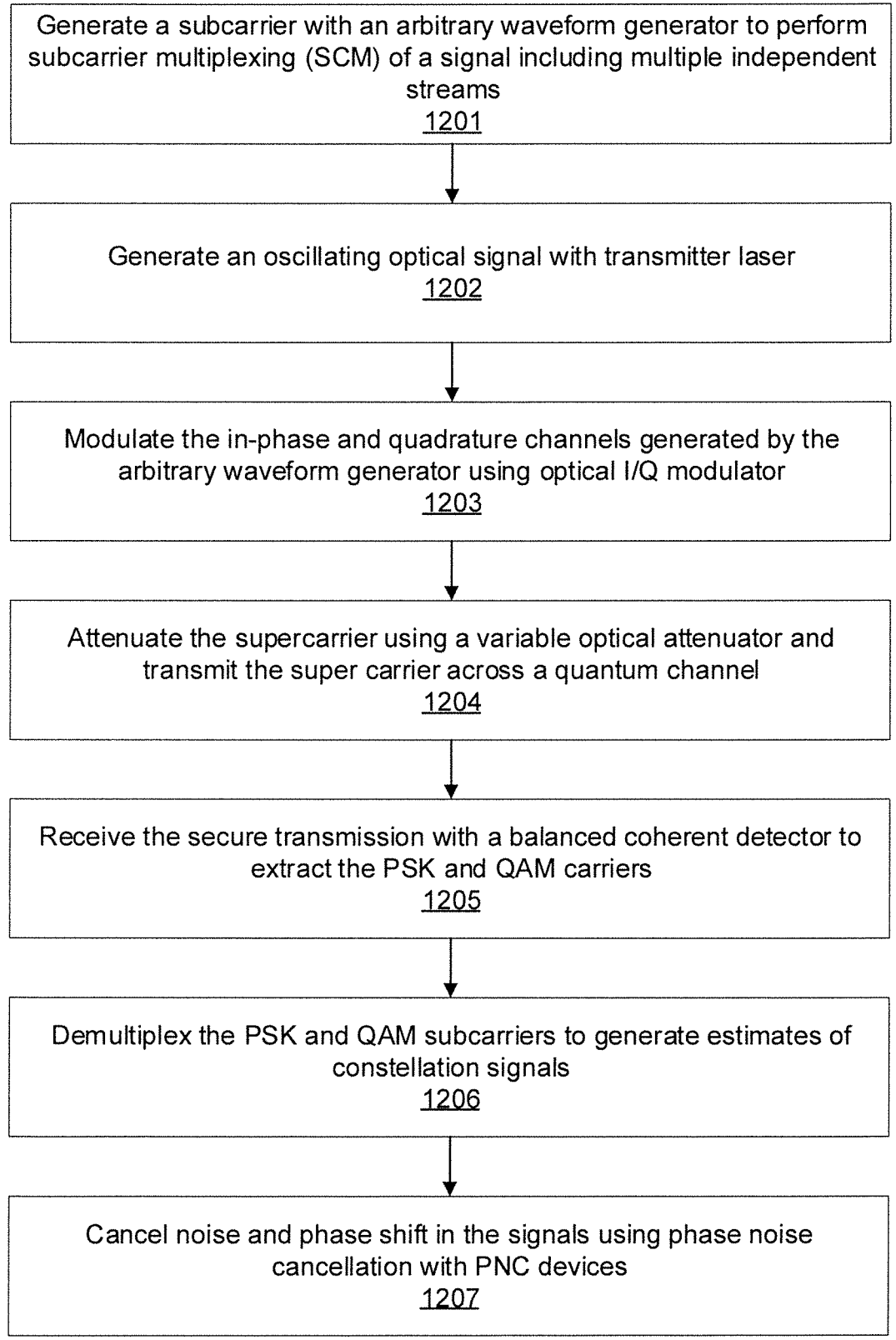
FIG. 16 is a block/flow diagram illustrating a system/method for unconditional physical layer security for optical wireless communication with OAM-modes-enabled secure multidimensional coded modulation, in accordance with the present principles.

Referring now to FIG. 16, unconditional physical layer security scheme for optical wireless communication with OAM-modes-enabled secure multidimensional coded modulation is illustratively depicted in accordance with one embodiment of the present principles.

According to aspects of the present invention, unconditional physical-layer security may be enhanced by employing modulation across OAM modes. The OAM modes may be used to increase the dimensionality of the signal and the signal constellation space, thus increasing secrecy capacity and secure key rates. Accordingly, a signal may be transmitted from a transmitter to an intended receiver in an unconditionally secure transmission, such that the signal is secure from any intercepting receiver.

At block 1201, the transmitter generates an arbitrary waveform with a multidimensional modulation scheme to perform subcarrier multiplexing (SCM) of a signal including multiple independent data streams. The data streams may include, e.g., data, a cryptographic key, or both. Accordingly, the multidimensional modulation scheme may be e.g., an arbitrary waveform generator, or a RF multidimensional modulator such as, e.g., a modulator as described above. The SCM may employ phase-shift keying (PSK) or quadrature amplitude modulation (QAM) constellation points. As described above, each of the channels may include multiple a multidimensional modulation by employing Slepian-sequence derived baseband basis functions.

At block 1202, the transmit laser generates an optical beam.

At block 1203, the transmitter sends the in-phase and quadrature channels generated by the multidimensional modulation scheme to an optical modulator. The optical modulator may be an I/Q optical modulator. Further, several multidimensional optical signals maybe combined by using OAM optical multiplexer and polarization division multiplexing devices.

As a result, the transmitter generates a signal constellation space that is highly multidimensional. This highly multidimensional constellation space ensures that an intercepting receiver that intercepts a given DOF will only receive a single constellation point amongst the many independent data streams multiplexed in the constellation. As a result, the intercepting receiver will be unable to reconstruct the transmitted signal. In the case that a raw key is sent in the signal, the intercepting receiver will be unable to intercept the full key, and thus be unable to compromise the security of a message. Moreover, even if OAM modes are coupled, security will still not be compromised because multiple other DOF are implemented, such as PSK and QAM. Therefore, risks of compromise due to OAM mode coupling are reduced.

At block 1204, the transmitter may also attenuate the supercarrier using a variable optical attenuator and transmit the supercarrier across the quantum channel. The supercarrier containing the data to be transmitted will be passed through the variable optical attenuator to reduce the power of the signal for optical transmission through a quantum channel. The quantum channel may be any communication medium suitable for carrying quantum information, such as orbital angular momentum, including, e.g., optical fiber and optical wireless communication link.

At block 1205, an intended receiver receives the secure transmission with a balanced coherent detector to extract the PSK and QAM carriers. The supercarrier may be passed through a polarization controller to ensure that its polarization is matched to the local laser polarization. The balanced coherent detector is configured to receive the supercarrier and extract the PSK and/or QAM carriers from the supercarrier, for example, e.g., by properly mixing the received optical signal and local laser signal, followed by photodetection process, to obtain the projections along in-phase and quadrature channels.

At block 1206, a subcarrier demultiplexer demultiplexes the PSK and QAM carriers corresponding to the in-phase channel and the quadrature channel to generate estimates of constellation signals. The subcarrier demultiplexer may include components for demultiplexing the in-phase and quadrature channels, such as, e.g. components as described in receivers above including an APP demapper and LLR calculator. Accordingly, the subcarrier demultiplex demultiplexes the PSK and QAM subcarriers to generate estimated constellation points.

At block 1207, the estimated constellation signals undergo phase noise cancellation using PNC devices. There may be as many PNC devices as there are independent data streams input into the transmitter. The PNC devices are configured to cancel the effects of laser phase noise and any random phase shift introduced by the quantum channel. According to aspects of the present invention, each PNC device includes two square operators, one addition operator, a digital DC cancellation block and a low pass filtering block. Squaring in-phase and quadrature channels of the optical carrier cancels the effects of laser phase noise and any random phase shifts introduced by the quantum channel, thus reducing bit-rate error. Accordingly, the original independent data streams may be estimated with low bit-rate error in a highly secure fashion.

After that information reconciliation, based on systematic LDPC coding, is performed in similar fashion as already proposed for QKD applications. To distill from the generated key a smaller set of bits whose correlation with Eve's string falls below the desired threshold, the privacy amplification is performed with the help of the universal hash functions.

Another way to enable unconditional security is to employ the microwave illumination approach, in which we can entangle mm-wave/THz/RF wave and optical beam, so that through FL-QKD approach we can achieve multi-Gb/s secure key rates over mm-wave/THz/RF links. In this scenario, the weak optical beam is used to monitor Eve's intrusion, while mm-wave/THz/RF link is used for raw-key transmission.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A wireless communication system for orbital angular momentum (OAM)-based multidimensional wireless communication, the wireless communication system comprising:
   a transmitter configured to generate an RF modulated signal carrying a data sequence;
   an OAM antenna array including at least one OAM antenna element, each of the at least one OAM antenna element including an azimuthal phase shifter and an antenna element, the antenna element generating a non-zero angular momentum J, wherein J is calculated using the expression below:

$$J = \frac{1}{4\pi c}\int_V E \times A dV + \frac{1}{4\pi c}\int_V \sum_{k=x,y,z}(r \times \nabla)A_k \, dV,$$

where J is an angular momentum of an electromagnetic (EM) field, c is the speed of light, E is the electric field intensity, A is the vector potential, r is the radius of the EM field, $\nabla$ is the del operator, and V is the volume in which propagation is observed; and
   the azimuthal phase shifter configured to shift an azimuthal phase term of a wavefront generated by the antenna element such that the OAM antenna element imposes the multidimensional modulated signal on a pre-determined OAM mode of a carrier signal corresponding to the azimuthal phase term.

2. The wireless communication system as recited in claim 1, wherein the OAM antenna array includes a linear antenna array, circular antenna array or a 2-dimensional (2D) antenna array.

3. The wireless communication system as recited in claim 1, the transmitter further including:
   an encoder configured to encode a sequence of symbols contained within the data sequence to generate an encoded sequence;
   a multidimensional mapper configured to implement a look-up-table (LUT) to map the encoded sequence to selected coordinates from a multidimensional signal constellation; and
   a multidimensional modulator configured to modulate the selected coordinates to generate the RF modulated signal carrying the selected coordinates to be imposed on the carrier signal by the at least one OAM antenna element.

4. The wireless communication system as recited in claim 3, wherein the OAM antenna array includes a plurality of OAM antenna elements and is configured to multiplex a plurality of RF modulated signals within the carrier signal, each RF modulated signal carrying a different data stream, by concurrently transmitting each of the RF modulated signals with a corresponding one of the OAM antenna elements having a pre-determined OAM mode corresponding to a unique azimuthal phase term.

5. The wireless communication system as recited in claim 3, wherein the multidimensional modulator is further configured to modulate the selected coordinates by performing quadrature amplitude modulation (QAM) over both in-phase and quadrature channels.

6. The wireless communication system as recited in claim 3, further including an OAM encryption stage configured to encrypt the data stream by randomly selecting an OAM mode to impose on the RF modulated signal, wherein the OAM mode is randomly selected by one of:
   a random switch configured randomly selecting an OAM antenna element from a plurality of OAM antenna elements; and
   an OAM antenna element including an adjustable azimuthal phase shifter wherein the adjustable azimuthal phase shifter is configured to randomly select an azimuthal phase shift of an antenna element.

7. The wireless communication system as recited in claim 6, wherein the OAM antenna array further includes a second random switch configured to mask an OAM mode corresponding to the selected OAM antenna element by imposing noise, with one or more additional OAM antenna elements having azimuthal phase terms shifted by different amounts from the selected OAM antenna element, a corresponding one or more masking OAM mode.

8. The wireless communication system as recited in claim 1, further including a receiver configured to receive the carrier signal via a receive OAM antenna array, the receiver including:
   a demodulator configured to demodulate an RF modulated signal to determine estimated constellation points, the RF modulated signal having been extracted from the carrier signal using the at least one OAM antenna element with the corresponding azimuthal phase term, the corresponding azimuthal phase term including a complex-conjugate azimuthal phase term for receiving the pre-determined OAM mode;
   a demapper configured to demap the estimated constellation points by estimating symbol log-likelihood ratios (LLRs) corresponding to each of the estimated constellation points using a posteriori probability detector; and
   a decoder configured to decode the symbol LLRs to determine estimated symbols corresponding to the data stream carried by the carrier signal.

9. The wireless communication system as recited in claim 8, wherein the receive OAM antenna array is configured to demultiplex a plurality of RF modulated signals carried by the carrier signal, each RF modulated signal carrying a different data stream, by concurrently extracting each of the RF modulated signals from a respective pre-determined OAM mode using an OAM antenna element having a complex-conjugate azimuthal phase term corresponding to the pre-determined OAM mode.

10. The wireless communication system as recited in claim 8, further including an OAM decryption stage having a maximum input selector configured to decrypt an encrypted OAM mode of the carrier signal by determining an OAM antenna element having the stronger output relative to each of a plurality of OAM antenna elements to select an OAM antenna element having the complex-conjugate azimuthal phase term corresponding to the encrypted OAM mode.

11. A wireless communication method for orbital angular momentum (OAM)-based multidimensional wireless communication, the wireless communication method comprising:
   generating with a transmitter an RF modulated signal carrying a data sequence; and shifting an azimuthal phase term of a wavefront generated by at least one antenna element of an OAM antenna element in an OAM antenna array with an azimuthal phase shifter such that the OAM antenna element imposes the multidimensional modulated signal on a pre-determined OAM mode of a carrier signal corresponding to the azimuthal phase term, the antenna element generating a non-zero angular momentum J, wherein J is calculated using the expression below:

$$J = \frac{1}{4\pi c}\int_V E \times A\, dV + \frac{1}{4\pi c}\int_V \sum_{k=x,y,z}(r\times \nabla)A_k\, dV,$$

where J is an angular momentum of an electromagnetic (EM) field, c is the speed of light, E is the electric field intensity, A is the vector potential, r is the radius of the EM field, $\nabla$ is the del operator, and V is the volume in which propagation is observed.

12. The wireless communication method as recited in claim 11, wherein the OAM antenna array includes a linear antenna array, circular antenna array or a 2-dimensional (2D) antenna array.

13. The wireless communication method as recited in claim 11, further including:
encoding, with an encoder, a sequence of symbols contained within the data sequence to generate an encoded sequence;
mapping, with a multidimensional mapper including a look-up-table (LUT), the encoded sequence to selected coordinates from a multidimensional signal constellation; and
modulating, with a multidimensional modulator, the selected coordinates to generate the RF modulated signal carrying the selected coordinates to be imposed on the carrier signal by the at least one OAM antenna element.

14. The wireless communication method as recited in claim 13, further including multiplexing, with the OAM antenna array having a plurality of OAM antenna elements, a plurality of RF modulated signals within the carrier signal, each RF modulated signal carrying a different data stream, by concurrently transmitting each of the RF modulated signals with a corresponding one of the OAM antenna elements having a pre-determined OAM mode corresponding to a unique azimuthal phase term.

15. The wireless communication method as recited in claim 13, wherein modulating the selected coordinates includes performing quadrature amplitude modulation (QAM) on both in-phase and quadrature channels.

16. The wireless communication method as recited in claim 13, further including encrypting the data stream by randomly selecting an OAM mode to impose on the RF modulated signal, wherein the OAM mode is randomly selected by one of:
a random switch configured randomly selecting an OAM antenna element from a plurality of OAM antenna elements; and
an OAM antenna element including an adjustable azimuthal phase shifter wherein the adjustable azimuthal phase shifter is configured to randomly select an azimuthal phase shift of an antenna element.

17. The wireless communication method as recited in claim 16, masking, with a second random switch, an OAM mode corresponding to the selected OAM antenna element by imposing noise, with one or more additional OAM antenna elements having azimuthal phase terms shifted by different amounts from the selected OAM antenna elements, on corresponding one or more masking OAM mode.

18. The wireless communication method as recited in claim 11, further including receiving via a receive OAM antenna array, the carrier signal, including:
demodulating, with a demodulator, an RF modulated signal to determine estimated constellation points, the RF modulated signal having been extracted from the carrier signal using the at least one OAM antenna element with the corresponding azimuthal phase term, the corresponding azimuthal phase term including a complex-conjugate azimuthal phase term for receiving the pre-determined OAM mode;
demapping, with a demapper, the estimated constellation points by estimating symbol log-likelihood ratios (LLRs) corresponding to each of the estimated constellation points using a posteriori probability detector; and
decoding, with a decoder, the symbol LLRs to determine estimated symbols corresponding to the data stream carried by the carrier signal.

19. The wireless communication method as recited in claim 18, demultiplexing, with the OAM antenna array, a plurality of RF modulated signals carried by the carrier signal, each RF modulated signal carrying a different data stream, by concurrently extracting each of the RF modulated signals from a respective pre-determined OAM mode using an OAM antenna element having a complex-conjugate azimuthal phase term corresponding to the pre-determined OAM mode.

20. The wireless communication method as recited in claim 18, decrypting, with the OAM antenna array, an encrypted OAM mode of the carrier signal by determining an OAM antenna element having the stronger output relative to each of a plurality of OAM antenna elements to select an OAM antenna element having the complex-conjugate azimuthal phase term corresponding to the encrypted OAM mode.

* * * * *